(12) United States Patent
Niida

(10) Patent No.: US 7,825,909 B2
(45) Date of Patent: Nov. 2, 2010

(54) STORAGE MEDIUM STORING OBJECT MOVEMENT CONTROL PROGRAM AND INFORMATION PROCESSING APPARATUS

(75) Inventor: Koichi Niida, Tokyo (JP)

(73) Assignee: Nintendo Co., Ltd., Kyoto (JP)

( * ) Notice: Subject to any disclaimer, the term of this patent is extended or adjusted under 35 U.S.C. 154(b) by 1065 days.

(21) Appl. No.: 11/541,663

(22) Filed: Oct. 3, 2006

(65) Prior Publication Data

US 2007/0075985 A1   Apr. 5, 2007

(30) Foreign Application Priority Data

Oct. 4, 2005   (JP) .............................. 2005-291785

(51) Int. Cl.
*G09G 5/00* (2006.01)
*G06F 3/033* (2006.01)
*G06F 3/041* (2006.01)

(52) U.S. Cl. ........................ 345/173; 345/169; 345/179

(58) Field of Classification Search .......... 345/156–184
See application file for complete search history.

(56) References Cited

U.S. PATENT DOCUMENTS 5,563,629 A * 10/1996 Caprara ...................... 345/160
5,696,532 A * 12/1997 Caprara ...................... 345/157
6,894,678 B2 * 5/2005 Rosenberg et al. .......... 345/157
2008/0012837 A1 * 1/2008 Marriott et al. ............. 345/173

FOREIGN PATENT DOCUMENTS

JP   5-31256   2/1993

* cited by examiner

*Primary Examiner*—David L Lewis
(74) *Attorney, Agent, or Firm*—Nixon & Vanderhye P.C.

(57) ABSTRACT

An information processing apparatus includes a processor. A movement of an object is controlled in accordance with an input. For example, a starting point of the input is determined by detecting coordinates in a first area including the object. A second area is set, with the starting point set as a reference, and when a continuous input after determining the starting point is given to the outside of the second area, detection coordinates are determined as an ending point of the input. Based on the ending point of the input and for example the starting point or an object position, a moving direction of the object is determined. Then, the object is moved in the moving direction thus determined.

20 Claims, 21 Drawing Sheets

DETERMINATION OF STARTING POINT, AND SETTING OF SECOND AREA AND THIRD AREA WITH THE STARTING POINT AS REFERENCE

★ STARTING POINT

DETERMINATION OF TIME MEASUREMENT STARTING POINT FOR MOVING SPEED

▲ TIME MEASUREMENT STARTING POINT

DETERMINATION OF ENDING POINT

★ ENDING POINT

DETERMINATION OF ENDING POINT

DETERMINATION OF STARTING POINT

DETERMINATION OF TIME MEASUREMENT STARTING POINT FOR MOVING SPEED

DETERMINATION OF ENDING POINT

DETERMINATION OF MOVING DIRECTION BASED ON INPUT LOCUS

FIG. 26
(A)
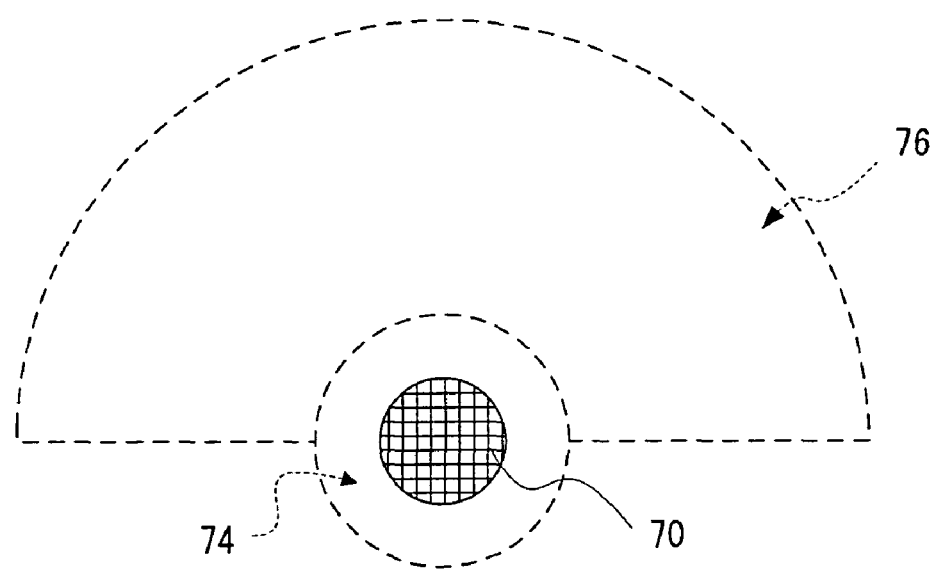
(B)
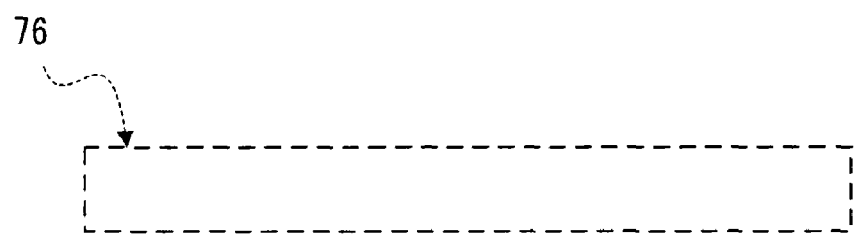
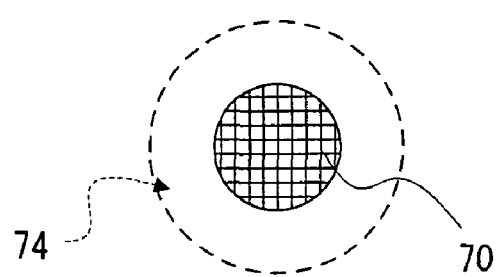

STORAGE MEDIUM STORING OBJECT MOVEMENT CONTROL PROGRAM AND INFORMATION PROCESSING APPARATUS

CROSS REFERENCE OF RELATED APPLICATION

The disclosure of Japanese Patent Application No. 2005-291785 is incorporated herein by reference.

BACKGROUND OF THE INVENTION

1. Field

Example embodiments of the present invention relate to a storage medium storing an object movement control program and an information processing apparatus. More specifically, example embodiments of the present invention relate to the storage medium storing an object movement control program and the information processing apparatus for moving an object on a screen in accordance with a slide input on a touch panel.

2. Description of the related art

Document 1 (Japanese Laid-Open Patent Publication No. 5-31256) discloses a technique for moving a virtual ball by a hitting simulation using a touch panel. Specifically, in the technique of the Document 1, coordinates corresponding to a locus of a pen are measured, when a user swings down a point of a pen on a virtual ball and successively swings up the pen. In the locus of the pen thus measured, a time point when a distance between adjacent coordinate points reaches a predetermined value or more for the first time is regarded as the time point when a swinging up motion is started, and a coordinate point at this time is determined as a starting point of hitting. In addition, the coordinate point corresponding to a position of the pen after a predetermined period elapses from when the pen is swung down on the virtual ball is determined as an ending point. An angle of a line connecting the starting point and the ending point is determined as a hitting direction of the virtual ball. Also, a maximum value of the distance between predetermined numbers of adjacent coordinate points sequentially from the ending point is determined as a hitting power. Further, a timing when the ending point is generated, namely, the timing after a predetermined period elapses from pen-down is determined as the timing of hitting.

According to the aforementioned related art, the coordinate point after a predetermined period elapses from the start of input is recognized as the ending point for determining the hitting direction. Therefore, it is difficult for a user to input a moving direction of the virtual ball as intended. For example, an accurate locus cannot be inputted, when a predetermined time set for determining the ending point is short. Namely, while the moving direction is still being inputted by the user, the ending point is determined, resulting in a situation that the virtual ball starts to move in a direction unintended by the user. Meanwhile, when the predetermined time is long, a redundant input is also measured after an accurate locus is inputted. Specifically, even if the user oneself considers that the accurate input is ended, a state of receiving an input still continues. Therefore, the ending point is determined by an unintentional input, and such an input is reflected on the moving motion of the virtual ball.

SUMMARY

Therefore, one aspect of example embodiments of the present invention is to provide a novel storage medium storing an object movement control program and an information processing apparatus.

Another aspect of example embodiments of the present invention is to provide a storage medium storing an object movement control program and an information processing apparatus capable of moving an object as intended by a user.

A storage medium storing an object movement control program of a first example embodiment of the invention provides a storage medium storing an object movement control program of an information processing apparatus for displaying on a display means an object moving in accordance with an input by an input means. The object movement control program of the storage medium causes a processor of the information processing apparatus to function as a coordinate detection means, a first determination means, a second determination means, a direction determination means, and a movement control means. The coordinate detection means detects coordinates inputted to a screen of the display means by the input means. The first determination means determines whether or not the coordinates detected by the coordinate detection means correspond to coordinates in a first area on the screen. The second determination means determines whether or not the coordinates continuously detected after a determination result by the first determination means is affirmative are coordinates positioned outside of a second area on the screen. The direction determination means determines a moving direction based on the coordinates detected when the determination result by the second determination means is affirmative. The movement control means controls the object to move in the moving direction determined by the direction determination means.

Specifically, a processor (42: a reference numeral corresponding to that in the embodiments described below. The same applied to following numerals.) of the information processing apparatus (10) executes a processing, following the object movement control program, and displays on the display means (14) the object (70) moving in accordance with the input by the input means (22). The coordinate detection means (S3 to S7, S103 to S107) detects the coordinates inputted to the display screen by the input means. The input means is a pointing device such as a touch panel, and the coordinates corresponding to a position designated by a user is detected by the coordinate detection means. The first determination means (S13, S111) determines whether or not the detection coordinates are the coordinates in a first area (74) on the screen. The first area is an area for determining whether or not the input for object movement is started by a user. For example, when the object is displayed on the screen, the first area may include a display area of the object. The first area may coincide with the display area of the object or may be an area wider than the display area by including the display area of the object, or may be an area narrower than the display area by including at least a part of the display area of the object (typically a center part of the display area of the object). In addition, the timing of displaying the object on the screen is properly set. For example, the object may be displayed at a predetermined position before the input by the user is started (for example, at a predetermined position (typically at a center position) in the first area), or may be displayed at a predetermined position, input start position, and the present input position, etc, after the input is started, or may be displayed at a movement start position when the moving direction is determined. The second determination means (S27, S129) determines whether or not the coordinates, that are continuously detected after the determination result by the first determination means is affirmative, are the coordinates positioned outside of a second area (76) on the screen. The second area is an area for determining the ending point of the input to the object. The second area may be provided, with the predetermined position in the first area set as a reference. The reference point in the second area may be the position of the object (such as center coordinates) or may be the starting point of the input. For example, a range in a predetermined distance from this reference may be the second area. In addition, the second area may be the same area as the first area, or may be a different area. The direction determination means (S53, S167) determines the moving direction based on the detection coordinates when the determination result by the second determination means is affirmative. The moving direction may be determined based on the coordinates when the detection coordinates are the coordinates positioned outside of the second area and the coordinates when the detection coordinates are the coordinates positioned inside of the first area, or may be determined based on the coordinates when the detection coordinates are the coordinates positioned outside of the second area and the position of the object, or may be determined based on the coordinates, when continuous input after detecting coordinates in the first area, is given to the outside of a predetermined area and the coordinates when the detection coordinates are the coordinates positioned outside of the second area. The movement control means (S57, S81, S87, S171) controls the movement of the object, so that the object moves in the moving direction determined by the direction determination means.

In addition, a movement start position of the object may be set to a predetermined position in the first area, to the detection coordinates when the determination result by the first determination means is affirmative, or to the detection coordinates when the determination result by a third determination means as will be described later is affirmative, for example. In this case, the object moves toward the determined moving direction from the start position.

Also, a moving route of the object may include the detection coordinates when the determination result by the second determination means is affirmative. Namely, the object moves toward the determined moving direction from the detection coordinates, or moves toward the determined moving direction so as to pass the detection coordinates.

According to example embodiments of the first invention, based on the coordinates detected when it is determined that the coordinates, that are continuously detected after detecting the coordinates in the first area, are the coordinates positioned outside of the second area, the moving direction of the object is determined. In this way, the range of the input for movement control and a position of an end accepted as an input can be clarified. Accordingly, since the coordinate point of an end of the input used for determining the moving direction can be determined as intended by the user, the object can be moved as intended by the user.

In a certain embodiment, the movement control means starts to move the object at a timing when the determination result by the second determination means is affirmative. Accordingly, when the coordinates outside of the second area are detected, the moving direction of the object is determined, thus making it possible to start to move the object in the moving direction.

In a certain aspect, the object movement control program causes the processor to further function as an object image displaying means for displaying an image of the object in the first area. The object is displayed in the first area on the screen by the object image displaying means (S1, S65, S101, S181). Accordingly, for example, when the object is displayed from the first, the coordinates corresponding to the display area of the object or the coordinates in the vicinity thereof need to be inputted. Alternatively, when the object is displayed in accordance with the start of the input or the determination of the moving direction, the object can be displayed in the first area in accordance with the input.

In another embodiment, the second area encompasses the first area. Thus, since the second area is provided so as to encompass the first area, the second area exists in the whole circumference of the first area. Therefore, it becomes possible to determine the coordinate point (such as the ending point of the input) for determining the moving direction in the whole directions of 360° from the first area, i.e. the object. Therefore, the object can be moved in all directions. The second area may be the same area as the first area, or may be a different area. In a case of the latter, the second area becomes a wide area by including the first area.

In still another embodiment, the second area is provided, with the coordinates detected when the determination result by the first determination means is affirmative as a reference. Namely, the second area for determining the coordinate point (such as the ending point of the input) used for determining the moving direction can be set, with the detection coordinates in the first area set as a reference, for example, with the starting point of the input to the object set as a reference. Therefore, the second area can be determined in accordance with a situation of the input to the first area (such as the display area of the object). Accordingly, since the input of the user after detecting coordinates in the first area can be more accurately measured, the intention of the user can be more accurately reflected on the movement of the object.

In still another embodiment, the second area is provided, with a predetermined position in the first area as a reference. Namely, the second area for determining the coordinate point (such as the ending point of the input) used for determining the moving direction can be set, with the predetermined position (such as the position of the object) in the first area set as a reference. Accordingly, since the input can be accurately measured, the movement, with the intention of the user accurately reflected thereon, can be performed.

In still another embodiment, the direction determination means determines the moving direction, based on the predetermined position in the first area and the coordinates detected when the determination result by the second determination means is affirmative. Accordingly, the moving direction of the object can be determined, based on the predetermined position (such as the position of the object) in the first area and the coordinate point (such as the ending point of the input) when the detection coordinates are the coordinates positioned outside of the second area. Therefore, for example, the object can be moved in a direction from the object toward the coordinate point (ending point) designated by the user.

In still another embodiment, the direction determination means determines the moving direction, based on the coordinates detected when the determination result by the first determination means is affirmative and the coordinates detected when the determination result by the second determination means is affirmative. Accordingly, the moving direction of the object can be determined, based on the coordinate point (such as the starting point of the input) when the detection coordinates are the coordinates positioned in the first area and the coordinate point (such as the ending point of the input) when the detection coordinates are the coordinates positioned outside of the second area. Therefore, for example, the object can be moved to the direction in that the user moves the input position.

In still another embodiment, the direction determination means determines the moving direction, based on the coordinates of at least two points out of the coordinates continuously detected by the coordinate detection means, in a period from when the determination result by the first determination means is affirmative, to when the determination result by the second determination means is affirmative.

Specifically, the direction determination means (S167) determines the moving direction based on the coordinates of at least two points out of a plurality of coordinate points from the coordinate point (such as the starting point of the input) when the detection coordinates are the coordinates positioned in the first area, to the coordinate point (such as the ending point of the input) when the detection coordinates are the coordinates positioned outside of the second area. Accordingly, for example, the intention of continuous input by the user can be reflected on the moving direction of the object.

In an aspect, the object movement control program causes the processor to further function as the third determination means for determining whether or not the coordinates continuously detected after the determination result by the first determination means is affirmative, are the coordinates positioned outside of a third area different from at least the second area on the screen. The direction determination means determines the moving direction, based on the coordinates detected when the determination result by the third determination means is affirmative and the coordinates detected when the determination result by the second determination means is affirmative.

Specifically, the third determination means (S21) determines whether or not the coordinates, that are continuously detected after detection of the coordinates in the first area, are the coordinates positioned outside of the third area (78). The third area is an area different from at least the second area. The third area, for example, may be provided, with a predetermined position in the first area set as a reference, or may be provided, with the coordinate point when there is the coordinate detection in the first area set as a reference. Then, by the direction determination means, the moving direction is determined, based on the coordinate point when the detection coordinates are the coordinates positioned outside of the third area and the coordinate point when the detection coordinates are the coordinates positioned outside of the second area. Accordingly, the input while hesitating in the third area after detecting the coordinates in the first area is not reflected on the moving direction, and based on the input after there is no hesitation of the user after determining the direction, the moving direction can be determined. Therefore, the intention of the user can be accurately reflected on the moving direction.

In still another aspect, the object movement control program causes the processor to further function as a speed determination means for determining a moving speed, based on a time period that elapses from when the determination result by the first determination means is affirmative, to when the determination result by the second determination means is affirmative. The movement control means controls the object to move at the moving speed determined by the speed determination means.

Specifically, the speed determination means (S169) determines the moving speed based on the elapsed time from when the coordinates are detected in the first area to when the detection coordinates are positioned outside of the second area. Namely, the second area corresponds to a determination area of the coordinate point for determining the moving direction and also corresponds to the determination area of a time measurement ending point for determining the moving speed. The movement control means moves the object at the determined moving speed. Accordingly, the range of the input for determining the moving speed is limited and clarified in a range from within the first area to outside of the second area.

Therefore, the input by the user can be correctly measured, and the object can be moved in a direction as intended by the user at a speed as intended by the user.

In still another aspect, the object movement control program causes the processor to further function as a speed determination means for determining the moving speed, based on the time period elapsed from when it is determined that the coordinates continuously detected after the determination result by the first determination means is affirmative are the coordinates positioned outside of a third area different from at least the second area on the screen, to when the determination result by the second determination means is affirmative. The movement control means controls the object to move at a moving speed determined by the speed determination means.

Specifically, the speed determination means (S55) determines the moving speed based on the time elapsed from when the continuous coordinates after detecting the coordinates in the first area are positioned outside of the third area, to when the coordinates are positioned outside of the second area. Namely, the second area serves as a determination area of the coordinate points for determining the moving direction, and also serves as the determination area of a time measurement ending point for determining the moving speed. Also, the third area serves as the area different from at least the second area, and for example, may be provided, with a predetermined position in the first area set as a reference, or may be provided, with the coordinate point when the coordinates are detected in the first area set as a reference, or may be identical to the first area. The movement control means moves the object at the determined moving speed. In this way, since the range of the input for determining the moving speed is limited and clarified in a range from the outside of the third area to the outside of the second area, the input by the user can be more accurately measured. Accordingly, the object can be moved in a direction as intended by the user at a speed of more accurately reflecting the intention of the user.

In still another embodiment, after the determination result by the first determination means is affirmative, when the coordinates are not detected by the coordinate detection means before the determination result by the second determination means is affirmative, the direction determination means determines the moving direction, based on the coordinates detected immediately before the coordinates are not detected, instead of the coordinates detected when the determination result by the second determination means is affirmative.

Specifically, the direction determination means cannot detect the coordinates outside of the second area when the coordinates are not detected before the continuous detection coordinates after detecting the coordinates in the first area are positioned outside of the second area. Therefore, the moving direction is determined, based on the detection coordinates immediately before the coordinates are not detected instead of the detection coordinates outside of the second area. Namely, when the input is ended by the user before the continuous input after detecting the coordinates in the first area is given to the outside of the second area, the moving direction can be determined based on the input coordinates immediately before the coordinates are not detected. In this way, even if the input is not given to the outside of the second area, the moving direction can be determined by making a non-input state, thus making it possible to start the movement of the object. Accordingly, for example, when the user determines that an instruction of a direction can already be inputted as intended by the user, the movement of the object can be quickly started by ending the input before the detection coordinates are positioned outside of the second area. In addition, when a plurality of objects is moved, these objects can be quickly and easily moved.

In still another embodiment, the movement control means does not move the object, when the coordinates are not detected by the coordinate detection means before it is determined that the coordinates continuously detected after the determination result by the first determination means is affirmative are the coordinates positioned outside of a third area different from at least the second area on the screen.

Specifically, the movement control means (S49, S161) does not allow the object to move, when the coordinates are not detected before the continuous coordinates after detecting the coordinates in the first area are positioned outside of the third area. The third area is the area different from at least the second area, and for example, may be provided, with a predetermined position in the first area set as a reference, or may be provided, with the coordinate point when there are the detection coordinates in the first area, set as a reference, or may be identical to the first area. In this way, when the coordinates outside of the third area are not detected even if there are the detection coordinates in the first area, the object cannot be moved. Therefore, the user can cancel the input, and the input can be started over.

In still another aspect, the object movement control program causes the processor to further function as an object generation means for generating, when the object is moved by the movement control means, another object different from the object.

Specifically, object generation means (S63, S179) generates another object when the object is moved in accordance with the input. Accordingly, every time one object is moved, another object can be generated, and therefore, a game such as sequentially moving a plurality of objects can be realized. For example, in a game such as hitting a ball against a target, the ball can hit the target by moving each ball as intended by the user while sequentially generating a plurality of balls. In addition, the movement of the object is controlled according to an on/off input state to the first area and the second area, and therefore the plurality of objects are sequentially moved without switching the existence/non-existence of the input, while the input is being continued.

In still another embodiment, the first area is larger than a display area of the object. Accordingly, the determination area of the input to the object is set larger than the display area of this object, and therefore the input for moving the object can be quickly started, thus improving operability.

In still another embodiment, the first area has the same size as that of a display area of the object. In this way, the determination area of the input to the object is set to the same size as the display area of this object, thus making it possible to request the user to input to the position corresponding to the display area of this object for starting the input to the object, for example, to exactly touch on the object in a case of a touch panel, for example.

A storage medium storing an object movement control program of a second example embodiment of the present invention provides a storage medium storing an object movement control program of an information processing apparatus for displaying on a display means an object moving in accordance with the input by an input means. The object movement control program of the storage medium causes the processor of the information processing apparatus to function as an object display control means, a coordinate detection means, a first determination means, a second determination means, a direction determination means, and a movement control means. The object display control means displays the object on the display means. The coordinate detection means detects the coordinates inputted to the screen of the display means by the input means. The first determination means determines whether or not the coordinates detected by the coordinate detection means correspond to coordinates in a first area on the screen. The second determination means determines whether or not the coordinates continuously detected after the determination result by the first determination means is affirmative are coordinates positioned outside of a second area on the screen. The direction determination means determines a moving direction based on the coordinates of at least two points out of the coordinates continuously detected by the coordinate detection means from when the determination result by the first determination means is affirmative, to when a determination result by the second determination means is affirmative. The movement control means moves the object in the moving direction determined by the direction determination means, at a timing when the determination result by the second determination means is affirmative.

Specifically, the processor (42) of the information processing apparatus (10) executes the processing, following the object movement control program, and displays on the display means (14) the object (70) moving in accordance with the input by the input means (22). The object display control means (S1, S65, S101, S181) displays the object on the display means. In addition, the timing when the object is displayed on the screen is properly set, and for example, the object may be displayed at a predetermined position from the start, or may be displayed at the predetermined position or input position when the input is started, or may be displayed at the predetermined position, an input start position or the present input position when the moving direction is determined. The coordinate detection means (S3 to S7, S103 to S107) detects the coordinates inputted to the display screen by the input means. The input means is a pointing device such as a touch panel, and the coordinates corresponding to the position designated by the user can be detected by the coordinate detection means. The first determination means (S13, S111) determines whether or not the detection coordinates are the coordinates in the first area (74) on the screen. The first area serves as the area for determining whether or not the input for moving the object is started by the user. For example, when the object is displayed on the screen, the first area may include the display area of the object. The second determination means (S27, S129) determines whether or not the coordinates, that are continuously detected after the determination result by the first determination means is affirmative, are the coordinates positioned outside of the second area (76) on the screen. The second area is the area for determining the ending point of the input to the object, for example. The second area may be provided, with a predetermined position in the first area set as a reference, for example. A reference point of the second area may be the position of the object (such as center coordinates), or may be the starting point of the input. For example, the range within a predetermined distance from this reference may be set as the second area. In addition, the second area may be the same area as the first area, or may be the different area. The direction determination means (S53, S167) determines the moving direction based on the coordinates of at least two points out of the coordinates, that are continuously detected from when the coordinates in the first area are detected to when the coordinates outside of the second area are detected. The moving direction may be determined based on the two points of the coordinates when the detection coordinates are positioned in the first area and the coordinates when the detection coordinates are positioned outside of the second area, or may be determined based on a plurality of coordinate points, for example, based on an average of an angle of a straight line connecting each adjacent coordinate points from within the first area to the outside of the second area. The movement control means (S57, S81, S87, S171) moves the object in a determined direction, at a timing when it is so determined that the continuous coordinates after detecting the coordinates in the first area become the outside of the second area.

According to example embodiments of the second invention, the moving direction is determined based on the continuous detection coordinates from when the coordinates in the first area are detected, to when the coordinates outside of the second area are detected, and the object is moved at a timing when the continuous detection coordinates are positioned outside of the second area. In this way, the range of the input for the movement control, the position of the end that can be received as input, and an input position where the movement of the object is started and so forth can be clarified. Accordingly, since the coordinate point of the end of the input used in determining the moving direction can be determined as intended by the user, the object can be moved as intended by the user.

An information processing apparatus of a third example embodiment of the present invention provides an information processing apparatus for displaying on a display means an object moving in accordance with an input by an input means. The information processing apparatus comprises a coordinate detection means, a first determination means, a second determination means, a direction determination means, and a movement control means. The coordinate detection means detects coordinates inputted to a screen of the display means by the input means. The first determination means determines whether or not the coordinates detected by the coordinate detection means correspond to coordinates in a first area on the screen. The second determination means determines whether or not the coordinates continuously detected after a determination result by the first determination means is affirmative are coordinates positioned outside of a second area on the screen. The direction determination means determines a moving direction based on the coordinates detected when a determination result by the second determination means is affirmative. The movement control means controls the object to move in the moving direction determined by the direction determination means.

The example embodiments of the third invention provide the information processing apparatus corresponding to the aforementioned example embodiments of the first invention, and in the same way as the aforementioned example embodiments of the first invention, the object can be moved as intended by the user.

A fourth example embodiment of the present invention provides an information processing apparatus for displaying on a display means an object moving in accordance with an input by an input means. The information processing apparatus comprises an object display control means, a coordinate detection means, a first determination means, a second determination means, a direction determination means, and a movement control means. The object display control means displays the object on the display means. The coordinate detection means detects coordinates inputted to a screen of the display means by the input means. The first determination means determines whether or not the coordinates detected by the coordinate detection means correspond to coordinates in a first area on the screen. The second determination means determines whether or not the coordinates continuously detected after a determination result by the first determination means is affirmative are coordinates positioned outside of a second area on the screen. The direction determination means determines a moving direction based on the coordinates of at least two points out of the coordinates continuously detected by the coordinate detection means from when the determination result by the first determination means is affirmative to when a determination result by the second determination means is affirmative. The movement control means moves the object in the moving direction determined by the direction determination means at a timing when the determination result by the second determination means is affirmative.

The example embodiments of the fourth invention provide the information processing apparatus corresponding to the aforementioned example embodiments of the second invention, and in the same way as the aforementioned example embodiments of the second invention, the object can be moved as intended by the user.

According to example embodiments of the present invention, the start of the input to the movement of the object is determined by the first area, and the end of the input to the movement of the object is determined by the second area. Then, based on the coordinates when the continuous coordinates after detecting the coordinates in the first area are positioned outside of the second area, or based on the coordinates of at least two points out of the coordinates, that are continuously detected from when the coordinates in the first area are detected to when the coordinates outside of the second area are detected, the moving direction of the object is determined, and the object is moved to the moving direction thus determined. In this way, the range of the input capable of controlling the movement of the object and the position of the end of the input for determining the moving direction can be clarified, and thus the coordinate points used in determining the moving direction can be determined as intended by the user. Accordingly, since the intention of the user can be reflected on the moving direction, a situation that the object moves in a direction not intended by the user can be eliminated, and the object can be moved as intended by the user.

The above described features, aspects and advantages of example embodiments of the present invention will become more apparent from the following detailed description of example embodiments of the present invention when taken in conjunction with the accompanying drawings.

BRIEF DESCRIPTION OF THE DRAWINGS

FIG. 26(A) and FIG. 26(B) are illustrative views showing modified examples of an arrangement of the second area with respect to the first area.

DETAILED DESCRIPTION OF THE NON-LIMITING EXAMPLE EMBODIMENTS

Figure 1:
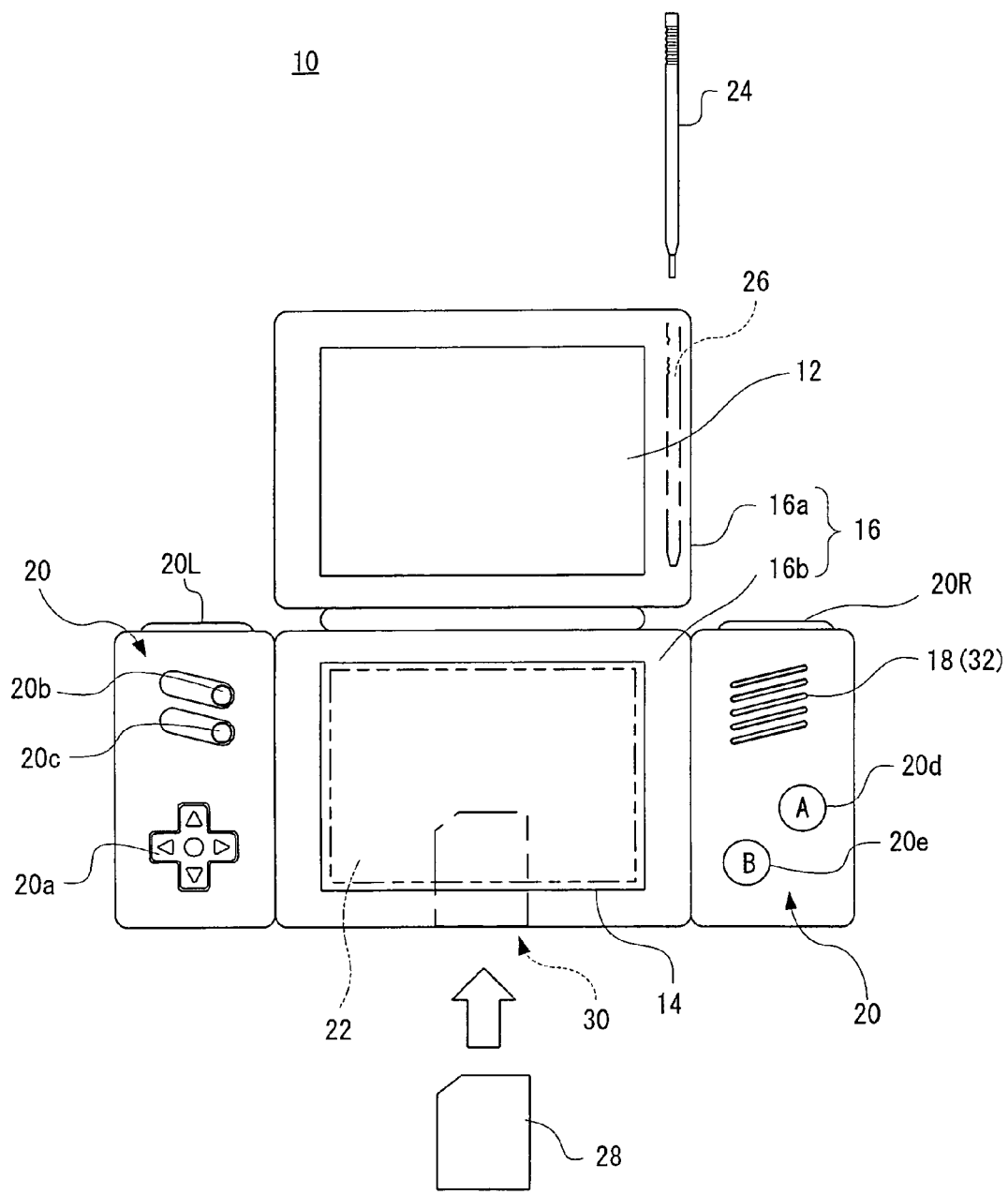
FIG. 1 is an outer appearance view showing an example of a game apparatus according to an example embodiment of the present invention.

Referring to FIG. 1, an information processing apparatus 10 of one embodiment of the present invention is implemented in the form of a game apparatus as an example. The information processing apparatus, that is, the game apparatus 10 includes a first liquid crystal display (LCD) 12 and a second LCD 14. The LCD 12 and the LCD 14 are provided on a housing 16 so as to be arranged in a predetermined position in the housing. In this embodiment, the housing 16 comprises an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

It should be noted that although the LCD is utilized as a display in this embodiment, an EL (Electronic Luminescence) display and a plasma display may be used in place of the LCD.

As can be understood from FIG. 1, the upper housing 16a has a plane shape little larger than a plane shape of the LCD 12, and has an opening formed so as to expose a display surface of the LCD 12 from one main surface thereof. On the other hand, the lower housing 16b has a plane shape horizontally longer than the upper housing 16a, and has an opening formed so as to expose a display surface of the LCD 14 at an approximately center of the horizontal direction. Furthermore, the lower housing 16b is provided with a sound emission hole 18 and an operation switch 20 (20a, 20b, 20c, 20d, 20e, 20L and 20R).

In addition, the upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotatably folded such that the display surface of the LCD 12 and the display surface of the LCD 14 are face to face with each other, it is possible to prevent the display surface of the LCD 12 and the display surface of the LCD 14 from being damaged such as a flaw, etc. It should be noted that the upper housing 16a and the lower housing 16b are not necessarily rotatably connected with each other, and may alternatively be provided integrally (fixedly) to form the housing 16.

The operation switch or operation key 20 includes a direction instructing switch (cross switch) 20a, a start switch 20b, a select switch 20c, an action switch (A button) 20d, an action switch (B button) 20e, an action switch (L button) 20L, and an action switch (R button) 20R. The switches 20a, 20b and 20c are placed at the left of the LCD 14 on the one main surface of the lower housing 16b. Also, the switches 20d and 20e are placed at the right of the LCD 14 on the one main surface of the lower housing 16b. Furthermore, the switches 20L and 20R are placed in a part of an upper edge (top surface) of the lower housing 16b at a place except for a connected portion with the upper housing 16a, and lie of each side of the connected portion.

It should be noted that, in this embodiment, a processing for controlling a movement of an object on a basis of coordinate inputted utilizing a touch panel 22 is executed as will be described later, and therefore a description of general functions of the operation switches 20 is presented here.

The direction instructing switch 20a functions as a digital joystick, and is utilized for instructing a moving direction of an operational object. More specifically, by operating any one of four depression portions, a player character (or player object) to be operated by a player or a cursor, or the like can be moved to a direction corresponding to the operated portion.

The start switch 20b is formed by a push button, and is utilized for starting (restarting), temporarily stopping a game, and so forth. The select switch 20c is formed by the push button, and utilized for a game mode selection, etc.

The action switch (action key) 20d, that is, the A button is formed by the push button, and utilized for an instruction of an action except for an instruction of a moving direction. This button allows the player character to perform an arbitrary movement (action), except for instructing the direction, such as hitting (punching), throwing, holding (obtaining), riding, jumping, cutting, etc. For example, in an action game, it is possible to apply an instruction of jumping, punching, moving arms, etc. In a role-playing game (RPG) and a simulation RPG, it is possible to apply an instruction of obtaining an item, selecting and determining arms or command, etc. Additionally, in menu selection, the player can use this button to confirm a menu item at which the cursor is placed, that is, a selected menu item and execute an action or process corresponding to the item.

The action switch 20e, that is, the B button is formed by the push button, and is utilized for changing a game mode selected by the select switch 20c, canceling an action determined by the A button 20d, and so forth. The B button can also be used as an action key for instructing a player character to make an action, as with the A button 20d.

The action switch (L button) 20L and the action switch 20R (R button) are formed by the push button, and the L button 20L and the R button 20R can perform the same operation as the action switch 20d, 20e or perform different operations. These buttons also can function as a subsidiary of the action switch 20d, 20e. Each of the above mentioned push buttons may be configured as a switch that is activated by depressing its key top. This allows the player to specify an action through an easy operation of depressing any of the switches.

Also, on a top surface of the LCD 14, a touch panel 22 is provided. As the touch panel 22, any one of kinds of a resistance film system, an optical system (infrared rays system) and an electrostatic capacitive coupling system, for example, can be utilized. In response to an operation by depressing, stroking, touching, hitting, and so forth with a stick 24, a pen (stylus pen), or a finger (hereinafter, referred to as "stick or the like 24") on a top surface of the touch panel 22, the touch panel 22 detects coordinates of a position indicated by the stick or the like 24 (that is, touched) to output coordinates data indicative of the detected coordinates. Accordingly, the player can input coordinates corresponding to the touched position, by operating the touch panel 22 with stick or the like 24.

It should be noted that in this embodiment, a resolution of the display surface of the LCD 14 is 256 dots×192 dots, and a detection accuracy of the touch panel 22 (operation surface) is also rendered 256 dots×192 dots in correspondence to the display surface (this is true for the LCD 12). However, in FIG. 1, in order to simply represent the touch panel 22, the touch panel 22 is displayed different from the LCD 14 in size, but the display screen of the LCD 14 and the operation screen of the touch panel 22 are the same in size. It should be noted that the detection accuracy of the touch panel 22 may be lower than the resolution of the display surface, or higher than it.

Thus, the game apparatus 10 has the LCD 12 and the LCD 14 as a display portion of two screens, and by providing the touch panel 22 on an upper surface of any one of them (LCD 14 in this embodiment), the game apparatus 10 has the two screens (12, 14) and the operation portions (20, 22) of two systems.

It is noted that although the first LCD 12 and the second LCD 14 are vertically arranged in this embodiment, the arrangement of the two LCDs may be changed as necessary. In the game apparatus 10 of another embodiment, the first LCD 12 and the second LCD 14 may horizontally be arranged.

Furthermore, although two LCDs each displaying a screen are provided in this embodiment, the number of the LCDs as a display means may be changed as necessary. In the game apparatus 10 of the other embodiment, it is appropriate that one LCD in the vertically long shape is provided, and by vertically dividing the area, two game screens are displayed on the respective areas. Or, it is appropriate that one LCD in the horizontally long shape is provided, and by horizontally dividing the area, two game screens are displayed on the respective areas.

The stick 24 can be inserted into a housing portion (slot or concavity) 26 provided in proximity to a side surface (right side surface) of the upper housing 16a, for example, and taken out therefrom as necessary. It should be noted that in a case of preparing no stick 24, it is not necessary to provide the housing portion 26.

Also, the game apparatus 10 includes a memory card (or game cartridge) 28. The memory card 28 is detachable, and inserted into a loading slot 30 provided on a rear surface or a lower edge (bottom surface) of the lower housing 16b. Although omitted in FIG. 1, a connector 46 (see FIG. 2) is provided at a depth portion of the loading slot 30 for connecting a connector (not shown) provided at an end portion of the memory card 28 in the loading direction, and when the memory card 28 is loaded into the loading slot 30, the connectors are connected with each other, and therefore, the memory card 28 is accessible by a CPU core 42 (see FIG. 2) of the game apparatus 10.

It should be noted that although not illustrated in FIG. 1, a speaker 32 (see FIG. 2) is provided at a position corresponding to the sound emission hole 18 inside the lower housing 16b.

Furthermore, although omitted in FIG. 1, for example, a battery accommodating box is provided on a rear surface of the lower housing 16b, and a power switch, a volume switch, an external expansion connector, an earphone jack, etc. are provided on a bottom surface of the lower housing 16b.

Figure 2:
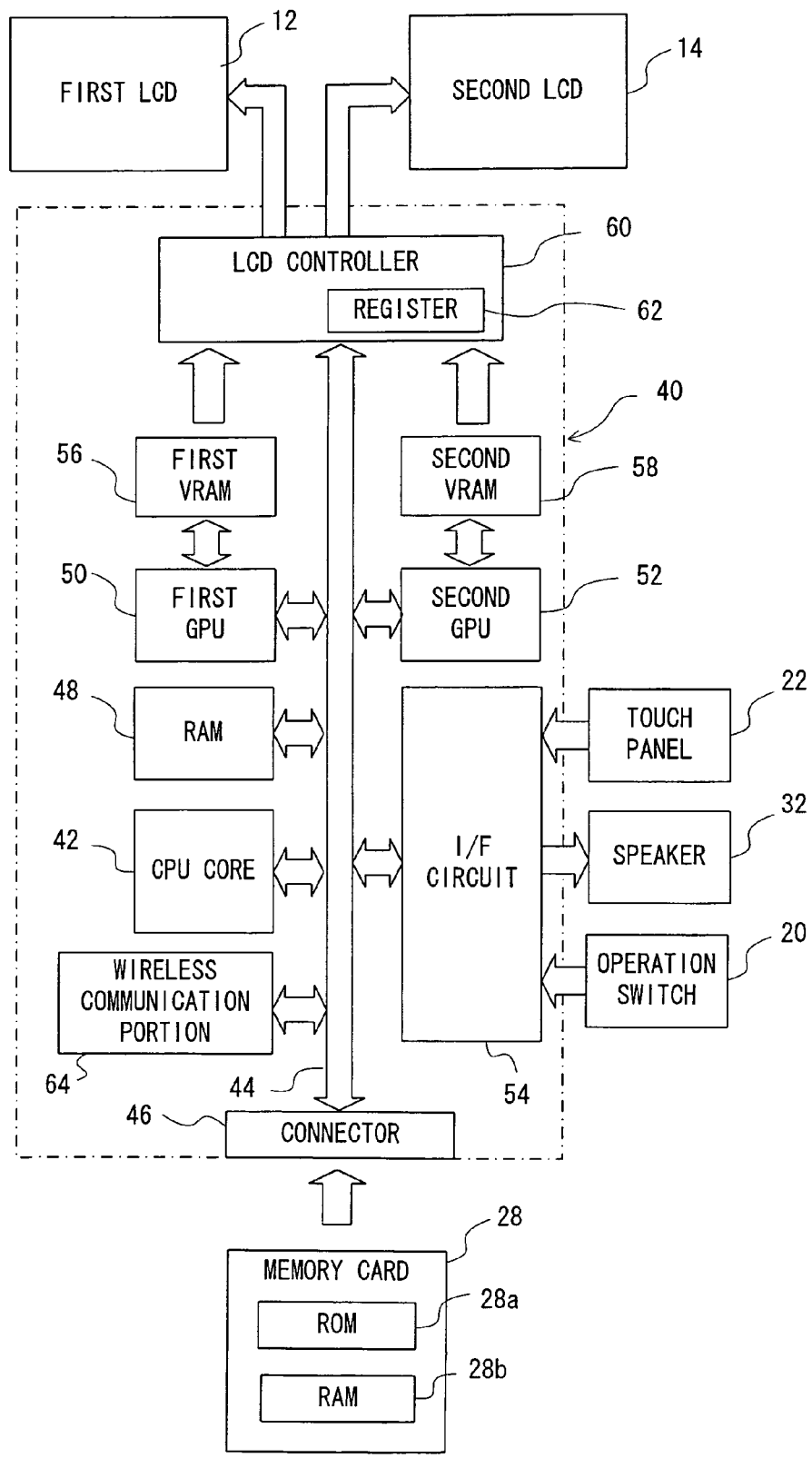
FIG. 2 is a block diagram showing an electrical constitution of the embodiment of FIG. 1.

FIG. 2 is a block diagram showing an electrical configuration of the game apparatus 10. Referring to FIG. 2, the game apparatus 10 includes an electronic circuit board 40, and on the electronic circuit board 40, a circuit component such as a CPU core 42, etc. is mounted. The CPU core 42 is connected to the connector 46 via a bus 44, and is connected with a RAM 48, a first graphics processing unit (GPU) 50, a second GPU 52, and an input-output interface circuit (hereinafter, referred to as "I/F circuit") 54, an LCD controller 60, and a wireless communication portion 64.

The connector 46 is detachably connected with the memory card 28 as described above. The memory card 28 includes a ROM 28a and a RAM 28b, and although illustration is omitted, the ROM 28a and the RAM 28b are connected with each other via a bus and also connected with a connector (not shown) to be connected with the connector 46. Accordingly, the CPU core 42 gains access to the ROM 28a and the RAM 28b as described above.

The ROM 28a stores in advance a game program for a game (virtual game) to be executed by the game apparatus 10, image data (character image, object image, background image, item image, icon (button) image, message image, cursor image, etc.), data of the sound (music) necessary for the game (sound data), etc. The game program includes an object movement control program of the embodiment. The RAM (backup RAM) 28b stores (saves) proceeding data and result data of the game.

It should be noted that if an application except for a game is executed, the ROM 28a of the memory card 28 stores a program for the application and image data necessary for execution of the application, etc. Also, sound (music) data is stored as necessary.

The RAM 48 is utilized as a buffer memory or a working memory. That is, the CPU core 42 loads the game program, the image data, the sound data, etc. stored in the ROM 28a of the memory card 28 into the RAM 48, and executes the loaded game program. The CPU core 42 executes a process while storing data (game data, flag data, etc.) generated or obtained in correspondence with a progress of the game in the RAM 48.

It should be noted that the game program, the image data, the sound data, etc. are loaded from the ROM 28a entirely at a time, or partially and sequentially as necessary so as to be stored into the RAM 48. However, like this embodiment, if the game apparatus 10 is able to directly connect a storage medium fixedly storing a program and data to the CPU core 42, the CPU core 42 can directly access the storage medium, and therefore, there is no need to transfer the program and the data to the RAM 48 so as to be held.

Each of the GPU 50 and the GPU 52 forms a part of a rendering means, is constructed by a single chip ASIC, for example, and receives a graphics command (construction command) from the CPU core 42 to generate game image data according to the graphics command. It should be noted that the CPU core 42 applies an image generation program (included in the game program) to both of the GPU 50 and GPU 52.

Furthermore, the GPU 50 is connected with a first video RAM (hereinafter, referred to as "VRAM") 56, and the GPU 52 is connected with a second VRAM 58. The GPU 50 and the GPU 52 respectively access the first VRAM 56 and the second VRAM 58 to obtain data necessary for executing the graphics command (image data: character data, texture data, etc.). It should be noted that the CPU core 42 reads image data necessary for rendering from the RAM 48, and writes it to the first VRAM 56 and the second VRAM 58 via the GPU 50 and the GPU 52. The GPU 50 accesses the VRAM 56 to generate game image data for display, and stores the image data in a rendering buffer in the VRAM 56. The GPU 52 accesses the VRAM 58 to create game image data for rendering, and stores the image data in a rendering buffer of the VRAM 58. A flame buffer or a line buffer may be employed as a rendering buffer.

The VRAM 56 and the VRAM 58 are connected to the LCD controller 60. The LCD controller 60 includes a register 62, and the register 62 consists of one bit, for example, and stores a value of "0" or "1" (data value) according to an instruction of the CPU core 42. The LCD controller 60 outputs the game image data created by the GPU 50 to the LCD 12, and outputs the game image data created by the GPU 52 to the LCD 14 in a case that the data value of the register 62 is "0". On the other hand, the LCD controller 60 outputs the game image data created by the GPU 50 to the LCD 14, and outputs the game image data created by the GPU 52 to the LCD 12 in a case that the data value of the register 62 is "1".

It should be noted that the LCD controller 60 can directly read the image data from the VRAM 56 and the VRAM 58, or read the image data from the VRAM 56 and the VRAM 58 via the GPU 50 and the GPU 52.

Also, the VRAM 56 and the VRAM 58 may be provided in the RAM 48, or the rendering buffer and a Z buffer may be provided in the RAM 48.

The I/F circuit 54 is connected with the operation switch 20, the touch panel 22 and the speaker 32. Here, the operation switch 20 is the above-described switches 20a, 20b, 20c, 20d, 20e, 20L and 20R, and in response to an operation of the operation switch 20, a corresponding operation signal (operation data) is inputted to the CPU core 42 via the I/F circuit 54. Furthermore, operation data output from the touch panel 22 (coordinates data) is inputted to the CPU core 42 via the I/F circuit 54. In addition, the CPU core 42 reads from the RAM 48 the sound data necessary for the game such as a game music (BGM), a sound effect or voices of a game character (onomatopoeic sound), etc., and outputs the sound from the speaker 32 via the I/F circuit 54.

The wireless communication portion 64 is a communication means for wirelessly sending and receiving data with other game apparatuses 10. The wireless communication portion 64 modulates communication data to be transmitted to the opponent from the CPU core 42 into a radio signal to send it from an antenna, and receives a radio signal from the opponent by the same antenna to demodulate it to communication data, and gives the communication data to the CPU core 42.

In the information processing apparatus 10, the movement of the object displayed on the screen is controlled in accordance with the input of the touch panel 22. As an example, an explanation will be given to a case of executing a game such as hitting a game object against a target by moving it on a game screen. Note that an object movement control processing is not limited to the game as shown in this embodiment, but can be applied to every case such as moving the object to another place on the screen.

Figure 3:
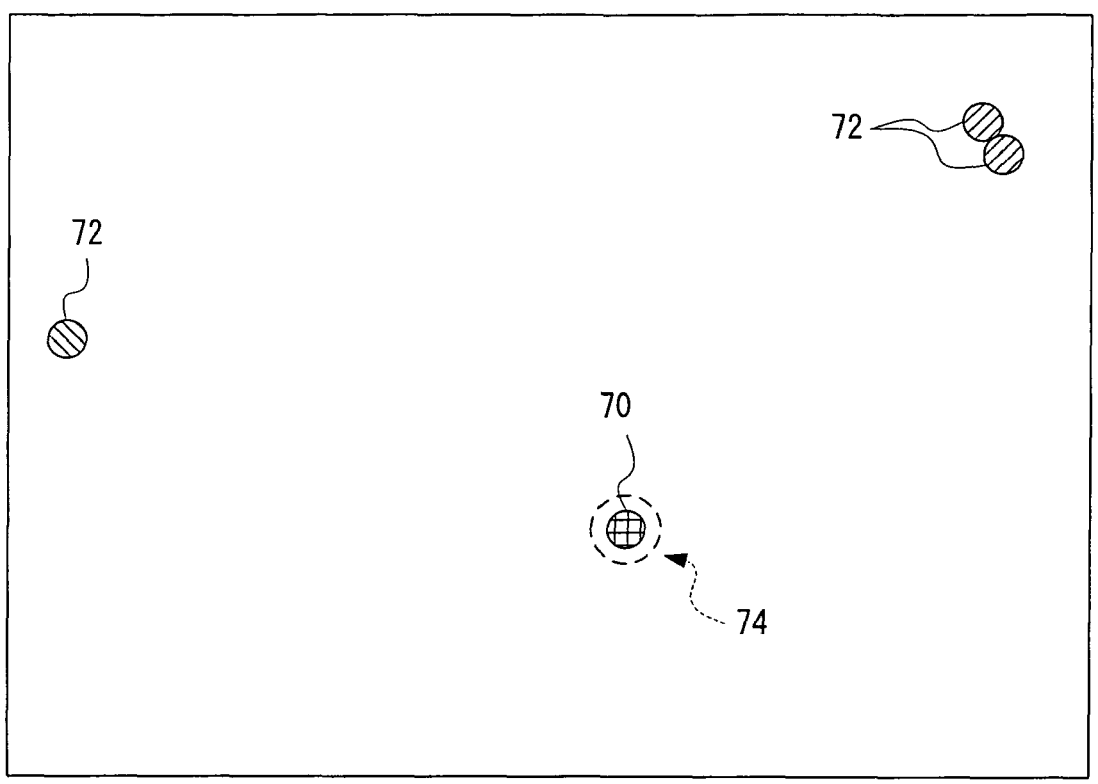
FIG. 3 is an illustrative view showing an example of a game screen displayed on an LCD 14.

FIG. 3 shows an example of the game screen. This game screen is displayed on the LCD 14 with the touch panel 22 put thereon. A ball 70 as an example of the game object is displayed at a place such as a predetermined position on the screen. A target 72 to be aimed at by the ball 70, is also displayed at a predetermined position. In this embodiment, details of the movement of the ball 70 are determined, in accordance with the input to a position on the touch panel 22 corresponding to the displayed ball 70, and then this ball 70 is moved. A player can move the ball 70 in a direction of the target 72, by an intuitive operation such as basically touching on the ball 70 to move a designated position by a stick or the like 24 in a direction to the target 72 from the ball 70.

In order to determine the on/off state of the input to the ball 70, a first area 74 including an area corresponding to the display area of the ball 70 is provided on an operation surface or an operation area. The first area 74 is the area for determining whether or not a purpose of the input to the touch panel 22 by the user is to touch on the ball 70 and move it.

In this embodiment, the first area 74 has a size slightly larger than the ball 70, and the ball 70 is disposed in the first area 74. According to this embodiment, both of the ball 70 and the first area 74 are circular, and the ball 70 is disposed, so that a center of the ball 70 coincides with a center coordinate of the first area 74. As an example, the diameter of the ball 70 may be set at about 18 dots, and the diameter of the first area 74 may be set at about 30 dots. In addition, a shape of the ball 70 is not limited to a circle, but may be changed appropriately to an oval, a triangle, and a rectangle. In addition, the first area 74 may be formed in a shape matched with the shape of the object 70, or may be formed in a predetermined shape without being matched with the shape of the object 70. As is shown in this embodiment, if the first area 74 is formed larger than the ball 70, the input to the ball 70 can be easily started by the user, and the input for moving the ball 70 can be quickly started, that is preferable in operability. It is particularly effective to set the first area 74 in a size to display the ball 70 smaller on the screen. When the ball is set in a large size or an operation is complicated on purpose, the display area of the ball 70 and the first area 74 may have the same size.

Figure 4:
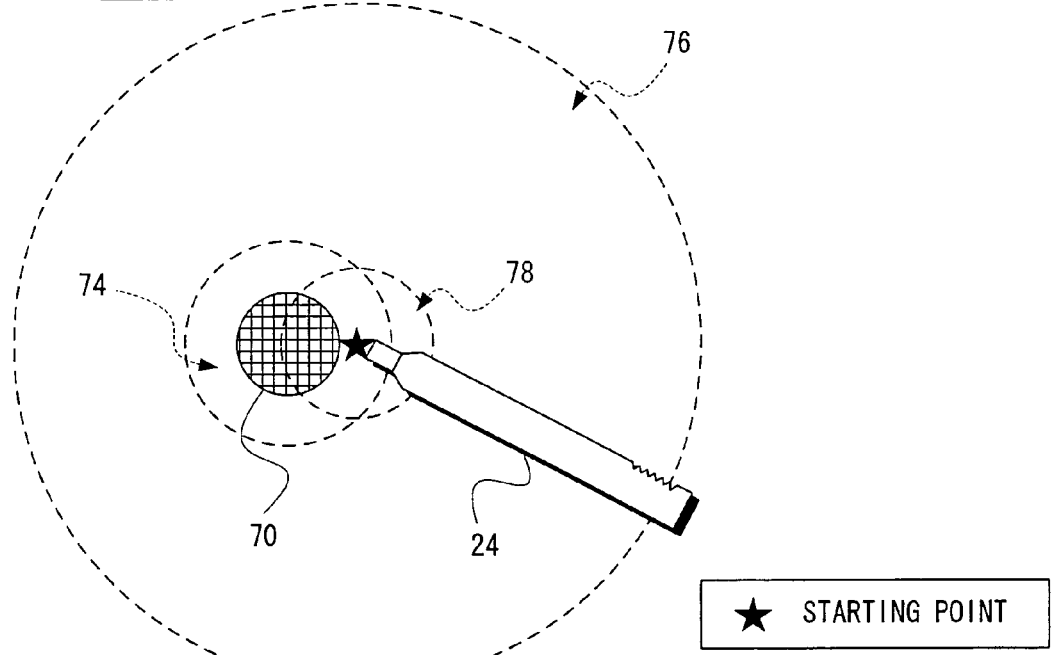
FIG. 4 is an illustrative view for explaining a determination of a starting point of an input to a ball and a setting of a second area and a third area.

With reference to FIG. 4, an explanation will be given to a specific case such as determining a start of the input to the ball 70. When it is determined that the input to the first area 74 is started, this time point is regarded as the start of the input to the ball 70. Namely, the following cases are regarded as the start of the input to the ball 70. That is, when a state is continuously changed from designating the outside of the first area 74 with the stick or the like 24 to designating the inside of the first area 74, or when a state is changed from a no-input state to the touch panel 22, to a state of firstly designating the inside of the first area 74.

According to this embodiment, when it is determined that the input to the first area 74 is started, the detection coordinates at that time are stored as the starting point. Then, in order to examine and measure the details of the behavior of the input by the user thereafter, a second area 76 and a third area 78 are set on the operation surface of the touch panel 22, with the aforementioned starting point set as a reference.

The second area 76 is provided, with a predetermined position in the first area 74 set as a reference, and as described above, is provided in this embodiment, with the starting point of the input set as a reference. The second area 76 is provided for determining the ending point of the input to the ball 70. Namely, a continuous slide input from the starting point is given to the outside of the second area 76, and this is regarded as the end of the input to the ball 70. The slide input means the input of moving a designating position while touching on the touch panel 22 with the stick or the like 24. The detection coordinates, when the slide input is given to the outside of the second area 76, are regarded as the ending point of the input. The moving direction of the ball 70 is determined based on at least this ending point, and in this embodiment, is determined based on the center point of the ball 70 and the ending point.

In addition, the third area 78 is provided for determining the starting point of measuring the time for determining the moving speed of the ball 70. When the slide input that continues from the starting point is given to the outside of the third area 78, the measurement of the time is started. Thereafter, when the slide input is given to the outside of the second area 76, the measurement of the time is ended. Based on the time thus measured, i.e. the time period from when the slide input is moved to the outside of the third area 78 to when it is moved to the outside of the second area 76, the moving speed of the ball 70 is determined.

Further, the time point, when the slide input that continues from the starting point is given to the outside of the second area 76, is the timing of starting the movement of the ball 70, and the ball 70 starts to move, following the moving direction and the moving speed determined as described above.

Specifically, the second area 76 is the range within a predetermined distance from the starting point, namely, a range of a circle corresponds to the second area 76, in that the starting point is defined as a center and the predetermined distance is defined as a radius. The predetermined distance defining the range of the second area 76 is stored beforehand as radius data of the circle, for example. As an example, the diameter of the second area 76 may be set at about 118 dots. The moving direction and the moving speed of the ball 70 are determined by determination of the second area 76, and then the ball 70 is shot. The size of the second area 76 is set at a value, so as not to include the position of the target 72 in the second area 76. Thus, the moving direction and the moving speed are determined before the slide input reaches the position of the target 72, and the ball 70 is shot. Therefore, properties of a game can be retained. Note that in other embodiment, the second area 76 may be set in the same area as the first area 78.

Also, the third area 78 is the range within the predetermined distance from the starting point, namely, the range of the circle corresponds to the third area 78, in that the starting point is defined as the center and the predetermined distance is defined as the radius. The value of the predetermined distance defining the third area 78 is set appropriately. However, the third area 78 is different from the second area 76, the predetermined distance defining the third area 78 is the value smaller than the predetermined distance defining the second area 76. The predetermined distance defining the range of the third area 78 is stored beforehand as the radius data of the circle, for example. As an example, the diameter of the third area 78 may be set at about 22 dots. Also, this third area 78 is a play area for allowing the user to hesitate before determining a shooting direction of the ball 70, and as long as the slide input is within the third area 78, even if it is moved here and there, the moving speed and the moving direction of the ball 70 cannot be determined and the ball 70 is not shot. It is simply required for the third area 78 to serve as the play area allowing the user to hesitate to shoot while touching on the ball 70. Therefore, the size of the third area 78 is set at a value about same as or slightly larger than the ball 70. In FIG. 4, the third area 78 has the size smaller than the first area 74 for determining the start of the input to the ball 70. However, the size of the third area 78 may be set to the same value as the first area 74, may be set to the value larger than the first area 74, or may be set to the same value as the ball 70.

In addition, as is clarified from FIG. 4, in this embodiment, the second area 76 is set in a size capable of including the ball 70 inside thereof and surrounding an overall circumference of the ball 70. Accordingly, the second area 76 is provided so that the ending point can be determined in all directions viewed from the ball 70. Therefore, the moving direction of the ball 70 can be set in all directions of 360° so as to be matched with the moving direction of the slide input.

In this embodiment, the first area 74, the second area 76, and the third area 78 are not clearly specified on the screen. According to this embodiment, the ball 70 can be moved in a desired direction by an intuitive operation of touching on the ball 70, grasping it, and sliding it in a desired direction. Accordingly, even if the first area 74, the second area 76, and the third area 78 are not displayed respectively, by setting the size of each area appropriately, the input of the user can be exactly measured and his/her intention can be accurately grasped. In addition, by defining the area set on the operation screen as a reference, the behavior of the input by the user is analyzed, and values of parameters (direction and speed) for controlling the movement of the ball 70 are determined. Therefore, by repeating the aforementioned intuitive operation several times, the user can understand how their own slide input is reflected on the moving direction, the moving speed, and the movement start timing, and so forth. Thus, the operability of allowing the user to easily perform a desired input is realized.

Further, in some cases, boundary lines of the first area 74, the second area 76, and the third area 78 may be displayed, or each area may be displayed by color different from that of other place. Since each area can be clearly specified to the user, the user can more quickly or accurately grasp a relation between the input and the movement control. For example, this embodiment is useful when a beginner has the hang of operating.

Figure 5:
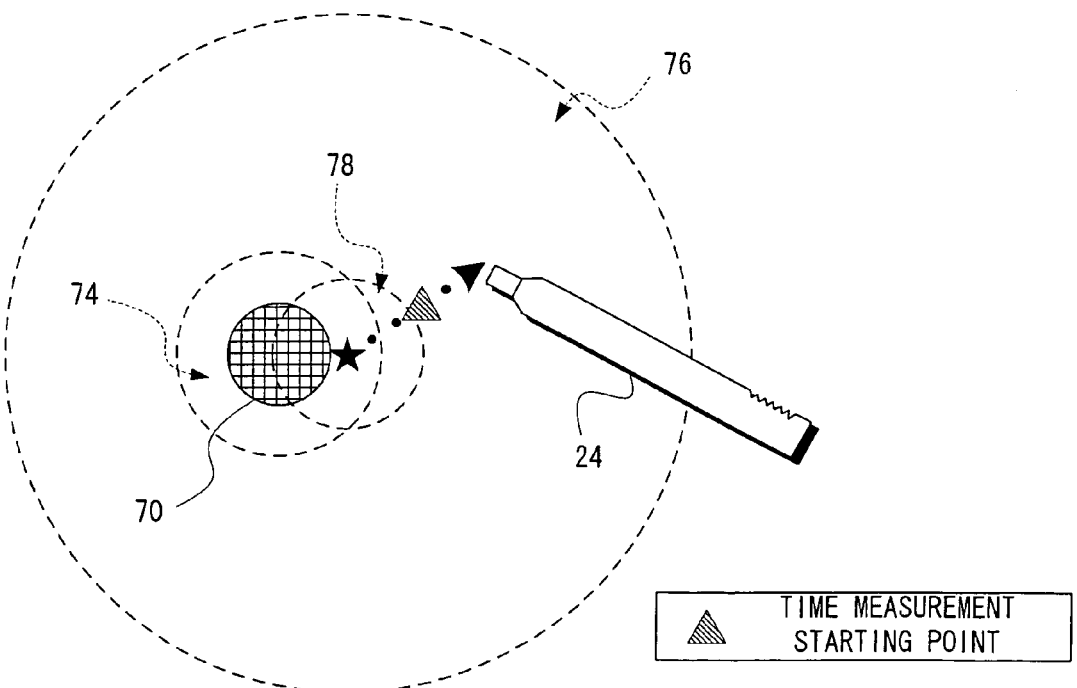
FIG. 5 is an illustrative view for explaining a determination of a time measurement starting point for determining a moving speed.

FIG. 5 shows a condition in determining the time measurement starting point for the moving speed. When the coordinates continuously detected after determining the starting point of the input shown in FIG. 4 are the coordinates positioned outside of the third area 78, the time measurement is started. For example, frame number at this time is stored as the measurement starting point. As described above, the third area 78 is the play area and the ball 70 is not shot as long as the slide input is not moved to the outside of the third area 78. Also, in a case that the stick or the like 24 is released from the touch panel 22 before the slide input is moved to the outside of the third area 78, this case is regarded as a cancel of the input, and the ball 70 is not moved. Meanwhile, when the slide input is moved to the outside of the third area 78 even at once, in this embodiment, the ball 70 is moved after the ending point is determined.

Figure 6:
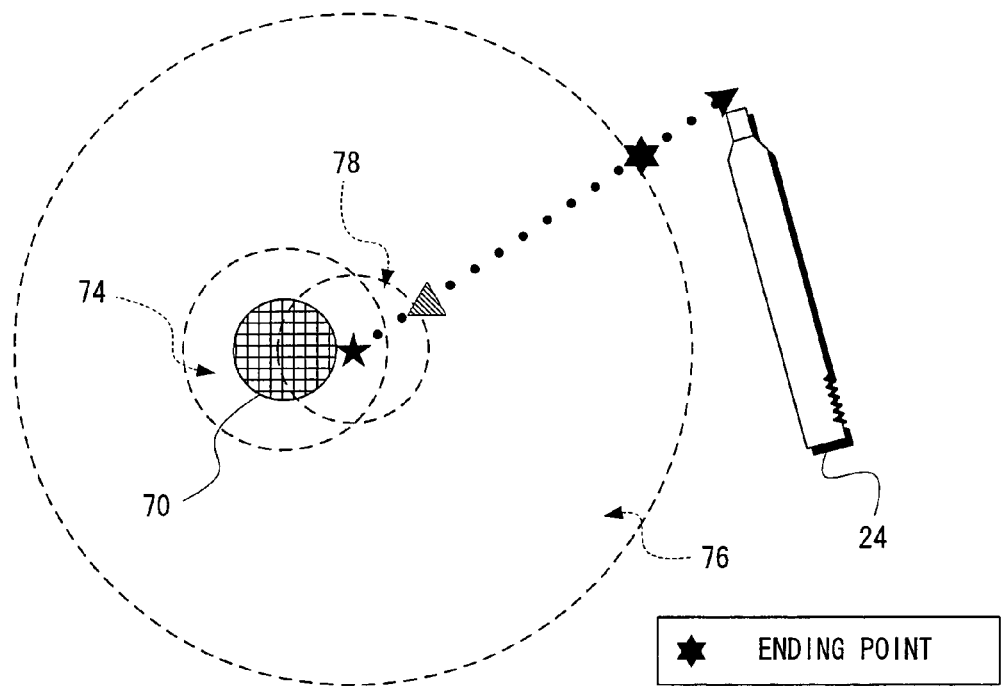
FIG. 6 is an illustrative view for explaining a determination of an ending point of the input to the ball.

FIG. 6 shows the condition in determining the ending point. The ending point determining condition corresponds to a determining condition of the ending point for the moving direction and the time measurement ending point for the moving speed, and also corresponds to a shooting condition of the ball 70. When the coordinates continuously detected after determining the starting point are the coordinates positioned outside of the second area 76, the coordinate point thus obtained is determined as the ending point of the input. In addition, the time measurement is ended, and for example, the frame number at this time is stored as the measurement ending point.

Figure 7:
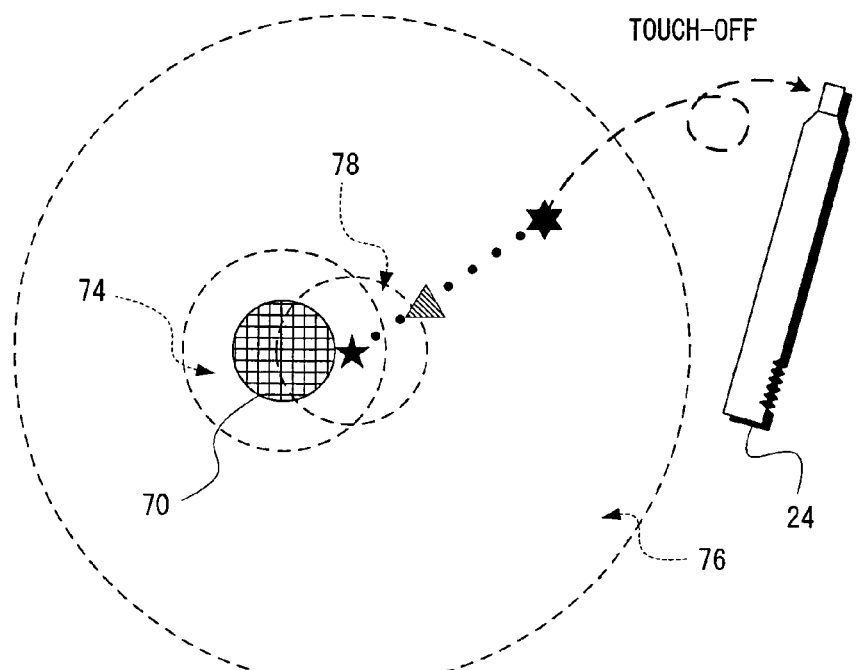
FIG. 7 is an illustrative view for explaining other example of the determination of the ending point.

FIG. 7 shows other condition in determining the ending point. When the slide input is touched-off after the slide input is moved to the outside of the third area 78 even at once, namely, when there is no detection of coordinates after detecting the coordinates outside of the third area 78 even at once in a continuous detection after determining the starting point, the time point at this time is regarded as the end of the input. In this case, the ending point of the input corresponds to the coordinate point detected immediately before the touch-off. In addition, the frame number, when the time measurement for the moving speed is ended and for example the touch-off is detected, is stored as the measurement ending point. Thus, even if the input is not moved to the outside of the second area 76, by making a no-input state, the ending point can be determined, and the movement of the object can be started. Accordingly, for example, when the user determines that a designation of the direction is already inputted as intended by the user, the ending point is determined by ending the input at a place outside of the third area 78, thus making it possible to quickly start the movement of the ball 70. Further, as is seen in this embodiment, when a plurality of balls 70 are sequentially moved, they can be quickly and easily moved.

Figure 8:
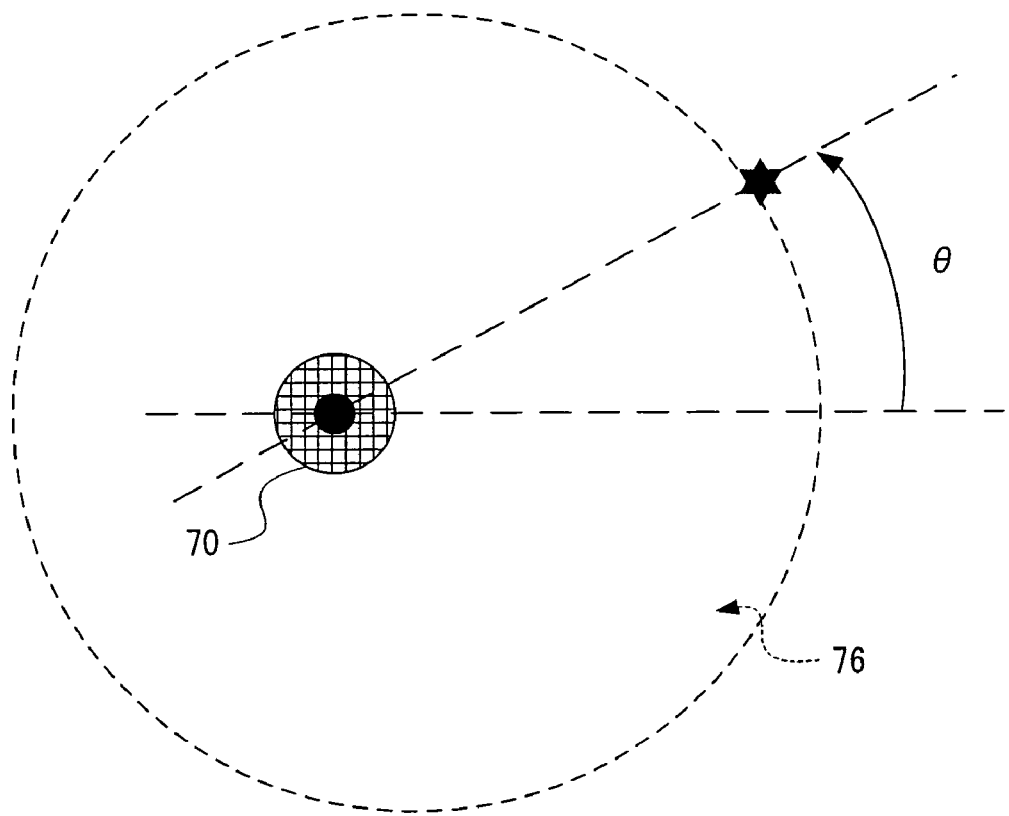
FIG. 8 is an illustrative view for explaining a determination method of the moving direction.

FIG. 8 shows an example of the determination method of the moving direction. According to this embodiment, the moving direction is determined based on the two points of the position of the ball 70 (such as the center of the display area) and the ending point of the input. Specifically, an angle θ formed by the straight line connecting the center of the ball 70 and the ending point, and a predetermined direction (such as a horizontal direction) on the operation surface, are calculated and determined as the moving direction. Also, the moving speed is determined based on passed frame numbers from the time point of starting the time measurement until the time point of ending the same, namely, based on the elapsed time from when the slide input is firstly moved to the outside of the third area 78 to when it is moved to the outside of the second area 76.

Figure 9:
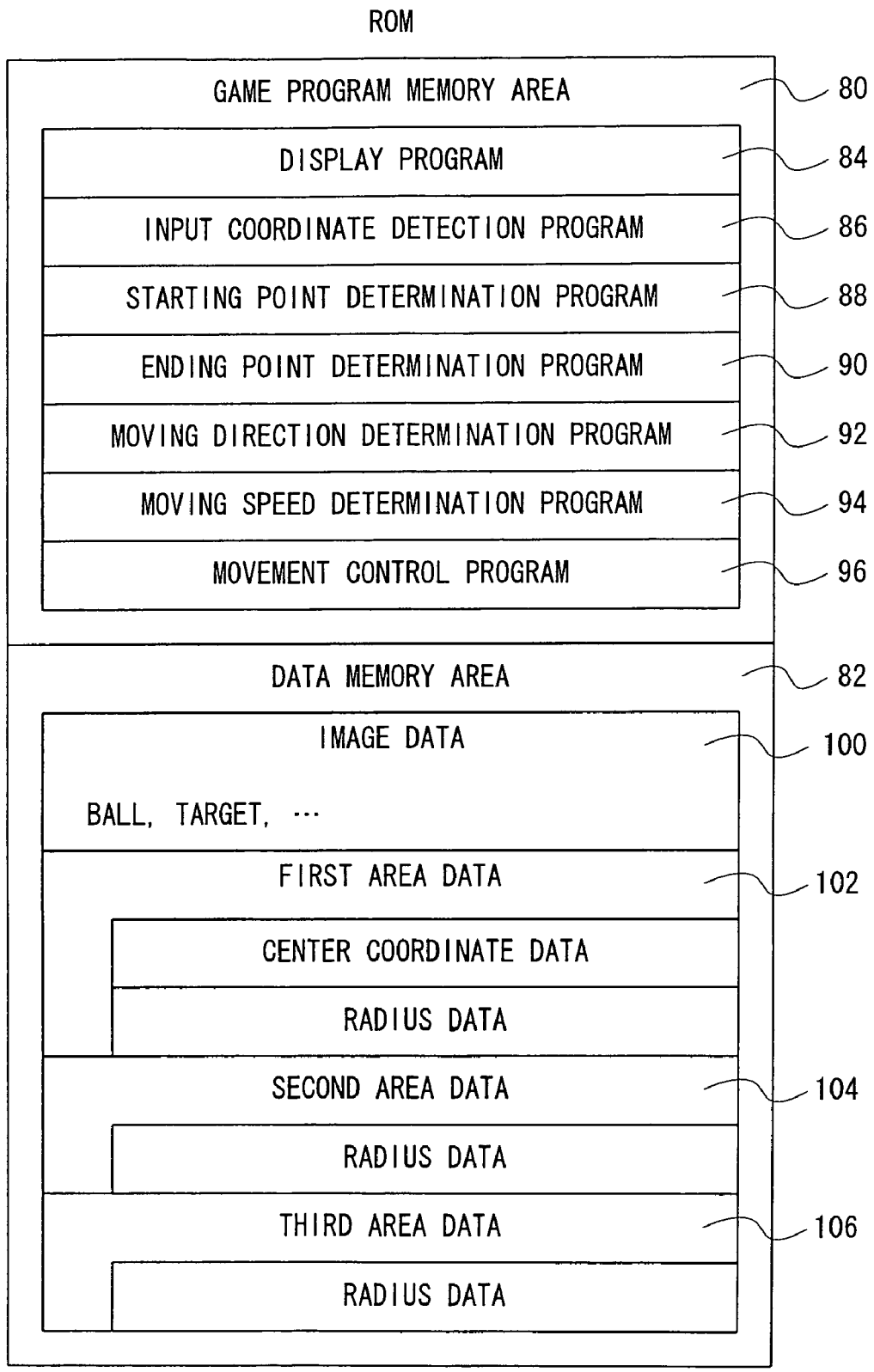
FIG. 9 is an illustrative view showing an example of a memory map of a ROM of a memory card.

FIG. 9 shows an example of the memory map of the ROM 28a of the memory card 28. The ROM 28a includes a game program memory area 80 and a data memory area 82. Note that in FIG. 9, a part of the memory map is shown, and other necessary programs and data are stored beforehand in the ROM 28a.

A display program is stored in a memory area 84. By this program, image data for displaying a screen, in that the ball 70 and the target 72 and so forth appear is generated by using image data, etc, and this screen is displayed on the LCD 14.

An input coordinate detection program is stored in the memory area 86. By this program, the on/off state of the input to the touch panel 22 and the coordinates at a position designated by the stick or the like 24 on the operation surface are detected from input data acquired from the touch panel 22. The input data from the touch panel 22 is detected for every fixed time (such as one frame (1/60 seconds)).

A starting point determination program is stored in the memory area 88. This program determines whether or not the determining condition of the starting point of the input to the ball 70 is satisfied. As the starting point determining condition, the following two points are given. Namely, according to this embodiment, as shown in FIG. 4, the detection coordinates are within the first area 74 in a state of not starting the input to the ball 70, or the detection coordinates in a no-input state to the touch panel 22 correspond to the coordinates in the first area 74. Also this program determines whether or not the determining condition at the time measurement starting point for the moving speed is satisfied. The measurement starting point determining condition in this embodiment is that, as shown in FIG. 5, the coordinates continuously detected after determining the starting point are the coordinates positioned outside of the third area 78 for the first time.

An ending point determination program is stored in a memory area 90. This program determines whether or not the determining condition of the ending point of the input to the ball 70 is satisfied. The ending point of the input corresponds to the ending point for the moving direction, and also corresponds to the time measurement ending point for the moving speed. As the ending point determining condition, the following two points are given. Namely, as shown in FIG. 6, the coordinates continuously detected after determining the starting point are the coordinates positioned outside of the second area 76, or as shown in FIG. 7, the coordinates are not detected (changed to a no-input state) after the coordinates outside of the third area 78 are detected.

A moving direction determining program is stored in a memory area 92. This program determines the moving direction of the ball 70 based on the position (center coordinates) of the ball 70 and the ending point. Specifically, as shown in FIG. 8, the angle θ formed by the straight line connecting the center of the ball 70 and the ending point, and a predetermined direction (such as a horizontal direction of the operation surface) may be determined as the moving direction.

A moving speed determination program is stored in a memory area 94. This program determines the moving speed of the ball 70, based on the elapsed time from the time point of measurement start to the time point of measurement end. According to this embodiment, the elapsed time is calculated by passed frame numbers from when the slide input is moved to the outside of the third area 78 to when it is moved to the outside of the second area 76, or the passed frame numbers from when the slide input is moved to the outside of the third area 78 to when the touch-off is detected. For example, table data is prepared whereby a typical elapsed time and the moving speed are corresponded, and with reference to this table data, the moving speed corresponding to the elapsed time may be selected or calculated. Note that by separating the elapsed time into a plurality of time divisions, the moving speed may be corresponded for each division. Alternatively, the moving speed may be calculated by following a predetermined relational expression based on the elapsed time. Note that in other embodiment, the moving speed may be set at a predetermined value without reflecting the input.

A movement control program is stored in a memory area 98. This program controls the movement of the ball 70, based on the determined moving direction and moving speed. The movement of the ball 70 is started when the ending point determining condition is satisfied by the ending point determination program, namely, when the moving direction and the moving speed are determined.

The image data is stored in a memory area 100. For example, the image data of the object such as the ball 70 and the target 72, and the image data of a background and so forth are stored.

Data for defining the first area 74 is stored in a memory area 102. This first area data includes the data on the position, range and size, etc. of the first area 74. In case of a circular first area 74 as is seen in this embodiment, for example, its center coordinate data and radius data (or diameter data) are stored.

Data for defining the second area 76 is stored in a memory area 104. This second area data includes the data on the range and size, etc. of the second area 76. In this embodiment, the second area 76 means the range in the circle provided with the starting point set as a reference after determining the starting point. The center coordinates of the circular second area 76 is given as the coordinates of the starting point. As the second area data, for example the radius data of the circular second area 76 is stored beforehand.

A memory area 106 stores data for defining the third area 78. In the same way as the second area 76, in this embodiment, the third area 78 also corresponds to the range in the circle provided, with the starting point set as a reference after determining the starting point, and the center coordinates of the circular third area 78 are given as the coordinates of the starting point. The third area data includes the data on the range and size, etc. of the third area 78, and for example the radius data is stored as the third area data.

Note that the determination whether or not the detection coordinates are inside or outside of the range of the first area 74, the second area 76 or the third area 78 may be performed in accordance with a determination formula based on the first area data, the second area data, the third area data, and the starting point coordinate data or the like. Alternatively, as to the first area 74, since an arrangement is determined beforehand, the data for reference showing all coordinates in the first area 74 may be prepared.

Figure 10:
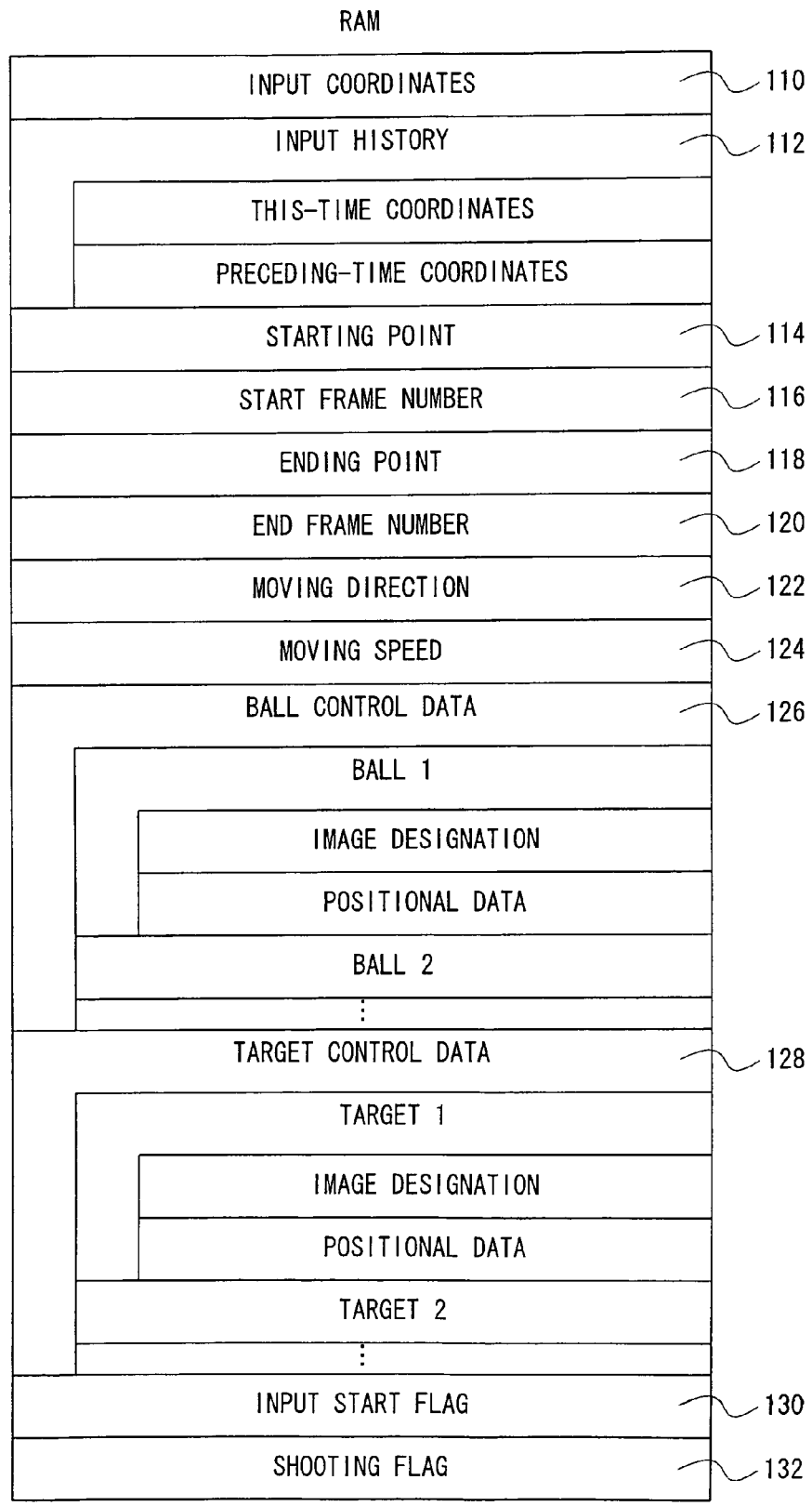
FIG. 10 is an illustrative view showing an example of a memory map of a RAM.
Figure 11:
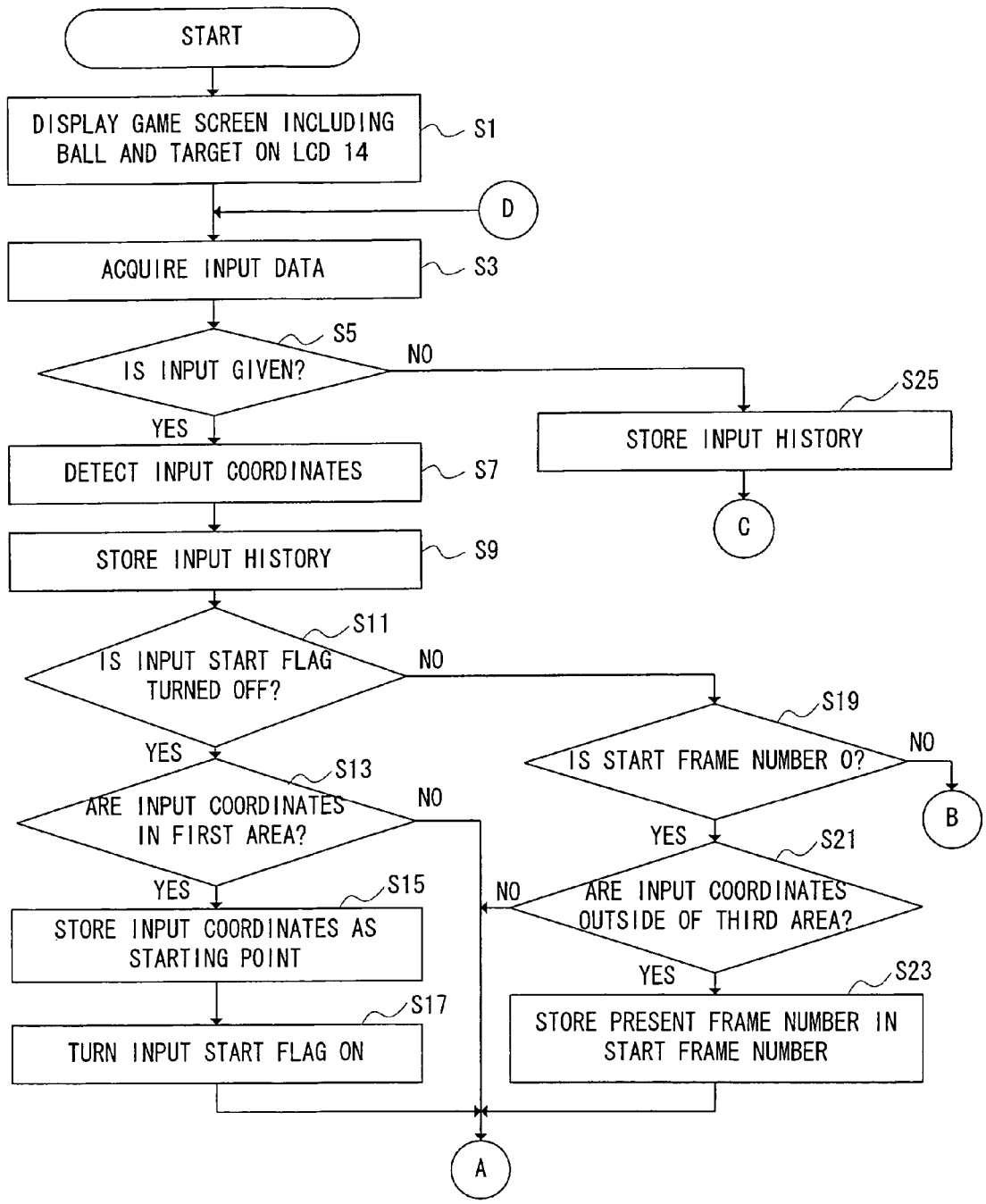
FIG. 11 is a flowchart showing a part of an example of an operation of the game apparatus according to the embodiment of FIG. 1.

FIG. 10 shows an example of the memory map of the RAM 48. Note that FIG. 10 shows a part of the memory map of the RAM 48, and various data necessary for the progress of the game is stored in the RAM 48.

An input coordinate memory area 110 stores coordinate data detected in the present frame by an execution of an input coordinate detection program. This-time coordinates showing the coordinates detected in the present frame and the preceding-time coordinates showing the coordinates detected in the previous frame are stored in an input history memory area 112 as an input history. When the input to the touch panel 22 is not performed and the coordinate data is not detected, the data showing no-input is stored instead of the coordinate data. Based on the input history, it is possible to detect the start of touch on the touch panel 22, and detect the release of the touch from the touch panel 22.

A starting point memory area 114 stores the detected coordinate data, when it is determined by the execution of a starting point determination program that the starting point determining condition is satisfied. In this embodiment, the starting point becomes the center of the second area 76 and the third area 78.

A start frame number memory area 116 stores the frame number, when it is determined by the execution of the starting point determination program that the condition of the time measurement starting point for the moving speed is satisfied. The memory area 116 stores, for example, "0" as an initial value, and "0" is also stored when an input cancel is detected.

An ending point memory area 118 stores the coordinate data of the ending point determined by the execution of an ending point determination program. Specifically, in a case of the condition shown in FIG. 6, the coordinates are stored, that are detected when it is determined that the condition is satisfied. In a case of the condition shown in FIG. 7, the coordinates are stored, that are detected in the frame immediately before it is determined that the condition is satisfied. In this embodiment, by using the ending point coordinates, the moving direction of the ball 70 is determined.

An end frame number memory area 120 stores the frame number when it is determined that the condition of the time measurement ending point for the moving speed is satisfied, namely, when the ending point is determined.

A moving direction memory area 122 stores data showing the moving direction determined by the execution of a moving direction determination program. A moving speed memory area 124 stores the data showing the moving speed determined by the execution of the moving speed determination program.

A ball control data memory area 126 can store control data of a plurality of balls 70. Note that, in this embodiment, as shown in FIG. 3, one ball 70 is generated at a predetermined position on the screen, and is moved in accordance with the slide input by the user as described above. When the ball 70 is moved, another ball 70 is immediately generated at the same predetermined position, and a plurality of balls 70 are displayed on the screen at the same time. This new ball 70 is also moved in accordance with the slide input by the user. Accordingly, the user can sequentially generates the plurality of balls 70 and move them, by continuously performing the slide input. Also, in another embodiment, the plurality of balls 70 may be respectively generated at a plurality of predetermined positions on the screen.

The control data of each ball 70 includes image designation data for designating an identification number of the image data used for displaying the ball 70, and positional data showing display coordinates on the screen or the coordinates in a virtual game space and so forth. The positional data stores the coordinates of a predetermined position where the ball 70 is generated, as an initial value. In this embodiment, the initial value is the center coordinates of the first area 74. Thereafter, the positional data is updated to the coordinates at a position after movement calculated based on the moving direction and the moving speed by the execution of the movement control program. The ball 70 is displayed in the coordinates shown by the positional data, based on the image data shown by the image designation data.

A target control data memory area 128 can store the control data of a plurality of targets 72. As shown in FIG. 3, the plurality of targets 72 may be generated at predetermined positions. In the same way as the aforementioned ball 70, the control data of each target 72 includes the image designation data and the positional data and so forth.

An input start flag memory area 130 stores a flag showing whether or not the input to the ball 70 is given by the user. The memory area 130 stores, for example, "0" as an initial value. When it is determined that the input to the ball 70 is started by the execution of the start point determination program, the input start flag is turned on by storing, for example, "1" in the memory area 130. Also, when it is determined that the input to the ball 70 is ended by the execution of the ending point determination program, "0", for example, is stored in the memory area 130, and the input start flag is turned off.

A shooting flag memory area 132 stores a flag showing whether or not the ball 70 is shot. The memory area 132 stores, for example, "0" as an initial value. When a shooting condition of the ball 70 is satisfied, namely, when it is determined that the ending point determining condition is satisfied by the execution of the ending point determination program, "1", for example, is stored in the memory area 132, and the shooting flag is turned on. When this shooting flag is turned on, movement processing of the ball 70 is started, and the shooting flag is turned off.

FIG. 11 to FIG. 14 show an example of an operation of a game apparatus 10. When a game processing is started, firstly in a step S1, the CPU core 42 generates a game screen including the ball 70 and the target 72 by following the display program, and displays it on the LCD 14. Specifically, the CPU core 42 generates game image data for displaying the game screen including the ball 70 and the target 72 in a drawing buffer of a VRAM 56 or 58 by using the GPU 50 or 52, and displays the game screen on the LCD 14 by using an LCD controller 60. Thus, as shown in FIG. 3, the game screen, in that the ball 70 and the target 72 are respectively disposed at the initial positions, is displayed on the LCD 14 having the touch panel 22 put thereon. The user can move the ball 70 by giving slide input at a place corresponding to the display area of the ball 70 and its circumference area, i.e. on the first area 74, by using the stick or the like 24 on the touch panel 22.

The CPU core 42 executes repeatedly the processing from a subsequent step S3 to a step S69 (FIG. 14) for every fixed period of time (such as 1 frame). The CPU 42 core executes the processing of the frame while counting the frame numbers.

In the step S3, the CPU core 42 acquires the input data from the touch panel 22 in the RAM 48 through an I/F circuit 54, by following the input coordinate detection program. Then, in a step S5, the CPU core 42 determines whether or not the input is given based on the input data.

If "YES" in the step S5, the CPU core 42 detects the coordinate data showing the input coordinates from the input data, and stores it in the input coordinate memory area 110 in a step S7.

In a subsequent step S9, the CPU core 42 stores the input history. For example, in the input history memory area 112, the CPU core 42 writes the data of the memory area of this-time coordinates in the memory area of the preceding-time coordinates, and writes the data of the input coordinates memory area 110 in the memory area of this-time coordinates. Note that the data showing "no-input" is stored in the input history memory area 112 in both cases of this-time coordinates and preceding-time coordinates, as initial values in initial setting.

Then, in a step S11, the CPU core 42 determines whether or not the input start flag is turned off. Here, the CPU core 42 confirms that the input to the ball 70 is not started yet. If "YES" in the step S11, the CPU core 42 determines whether or not the input coordinates are the coordinates in the first area 74 based on the data of the input coordinates memory area 110 and the data of the first area data memory area 102, etc., by following the starting point determination program in a step S13. Thus, it is possible to determine whether or not the slide input is moved to the inside of the first area 74 in a state of not starting the input to the ball 70, and determine whether or not touch is started in the first area 74.

If "YES" in the step S13, namely, when it is determined that a starting point condition of the input to the ball 70 is satisfied, the CPU core 42 determines the input coordinates detected in a step S7 of the present frame as a starting point, and stores the input coordinates data in the staring point memory area 114 in a step S15. The second area 76 and the third area 78 are set, with this starting point set as a reference. Then, in a step S17, the CPU core 42 writes, for example, "1" in the input start flag memory area 130, and turns on the input start flag. After completion of the step S17, the process advances to a step S51 of FIG. 14.

Figure 14:
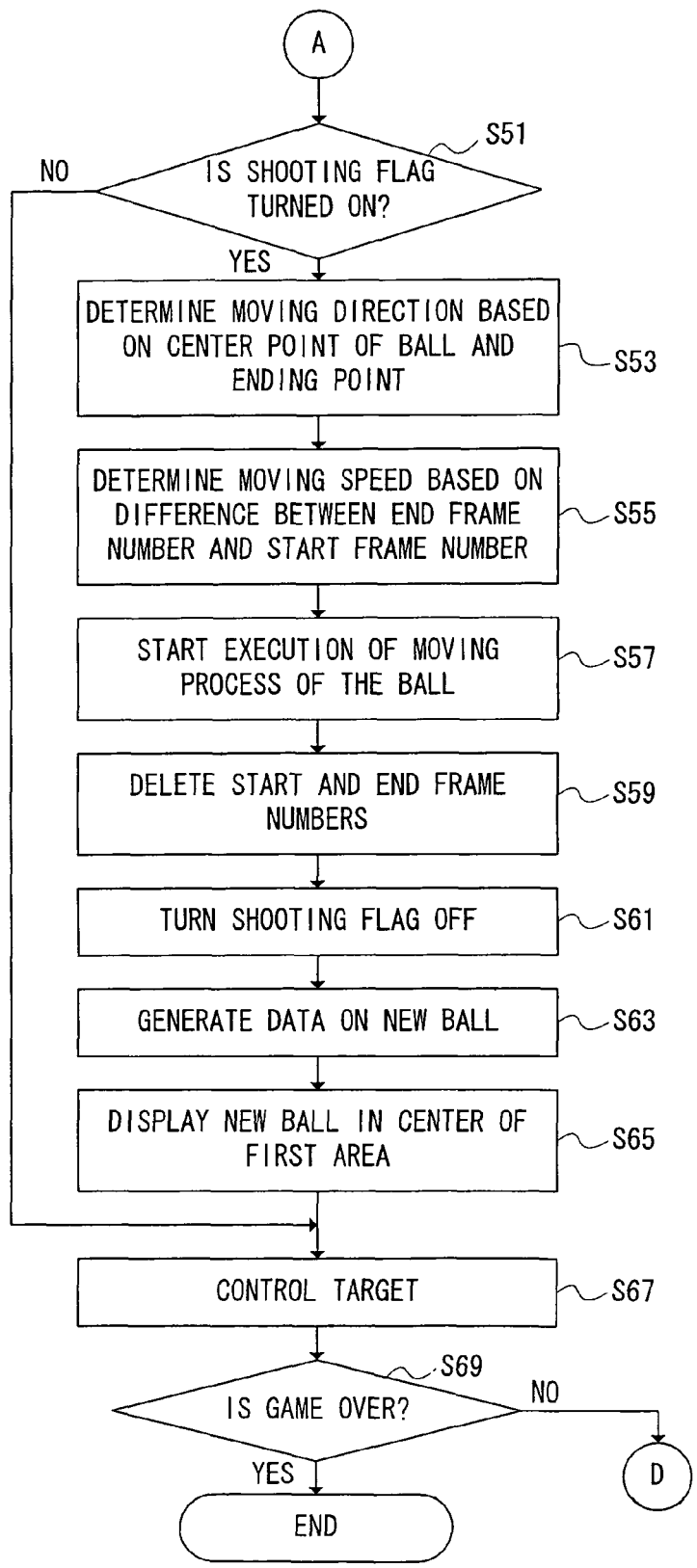
FIG. 14 is a flowchart showing the continuance of FIG. 11, FIG. 12, and FIG. 13.

Note that if "NO" in the step S13, namely, when outside of the first area 74 is touched in a stage of not starting the input to the ball 70, the process advances to the step S51 of FIG. 14 as it is.

Meanwhile, if "NO" in the step S11, namely, when the input to the ball 70 is taking place, the CPU core 42 determines whether or not the start frame number is "0" in a step S19. Here, the CPU core 42 confirms that the condition of the time measurement starting point is not satisfied after determining the starting point, namely, the coordinates continuously detected after determining the starting point are not the coordinates positioned outside of the third area 78 even at once.

If "YES" in the step S19, in a step S21, the CPU core 42 determines whether or not the input coordinates are the coordinates outside of the third area 78 by following the starting point determination program, based on the data of the starting point memory area 114 and the data of the third area data memory area 106, etc.

If "YES" in the step S21, namely, when it is determined that the condition of the time measurement starting point is satisfied, the CPU core 42 stores the present frame number in the start frame number memory area 116 in a step S23. Thus, the time measurement for the moving speed is started. After completion of the step S23, the process advances to the step S51 of FIG. 14.

Note that if "NO" in the step S21, namely when the slide input after determining the starting point is not moved to the outside of the third area 78, the process advances to the step S51 of FIG. 14 as it is.

Figure 12:
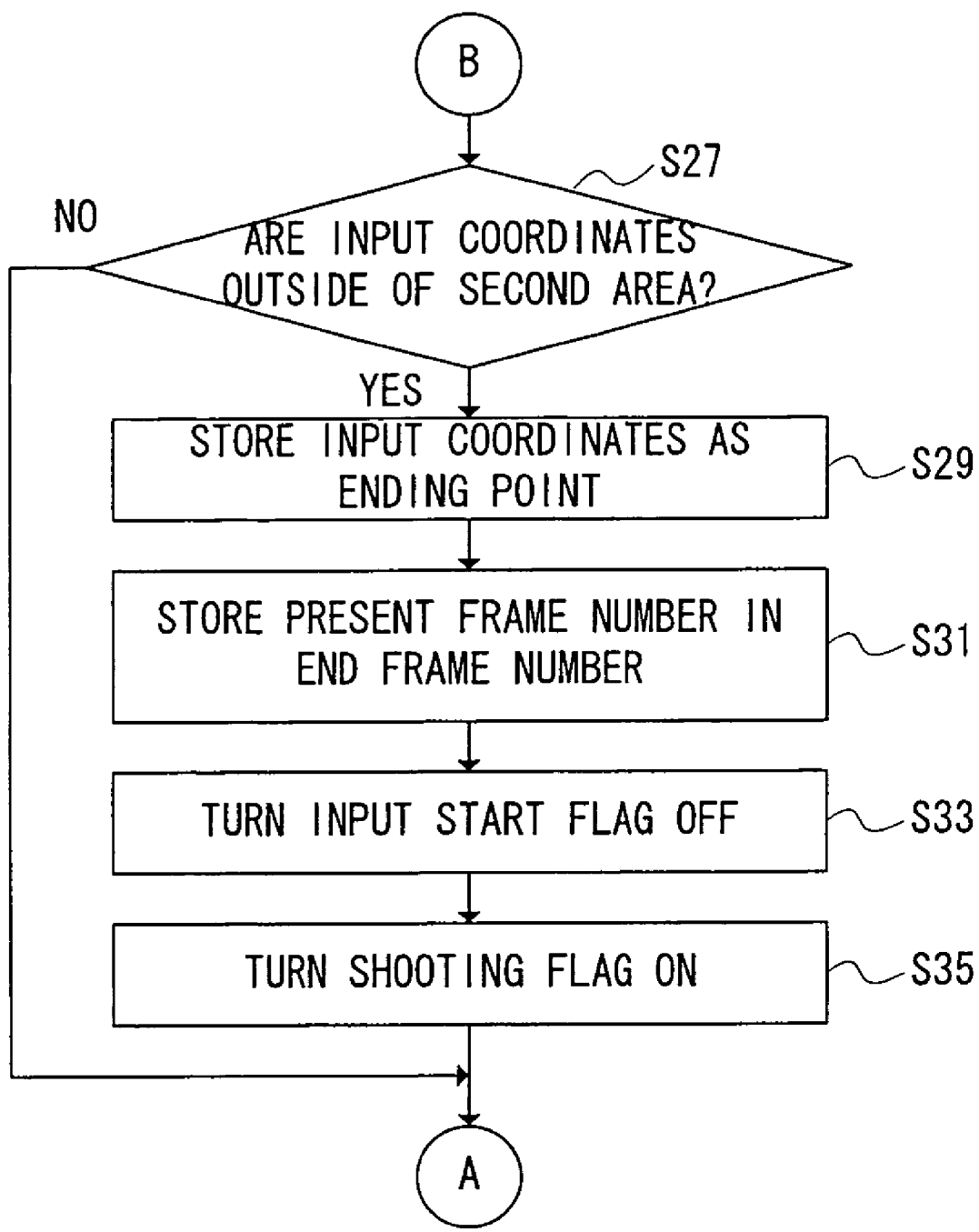
FIG. 12 is a flowchart showing a part of a continuance of FIG. 11.

Meanwhile, if "NO" in the step S19, namely, when the slide input after determining starting point is moved to the outside of the third area 78 and the time measurement is already started, the process advances to a step S27 of FIG. 12 to determine the condition of an input ending point.

Also, if "NO" in the step S5, namely, when the input to the touch panel 22 is not performed, the CPU core 42 stores the input history in a step S25. Namely, in the input history memory area 112, the PCU core 42 stores the data stored in the memory area for this-time coordinates, in the memory area for preceding-time coordinates, and stores the data showing no-input state, in the memory area for this-time coordinates. After completion of the step S25, the process advances to a step S37 of FIG. 13.

When the time measurement is started, namely, if "NO" in the step S19, in the step S27 of FIG. 12, the CPU core 42 determines whether or not the input coordinates are the coordinates outside of the second area 76 by following the ending point determination program based on the starting point data and the data of the second area data memory area 104, etc. Namely, determination of conditions is performed, such as ending point determining condition of input, time measurement ending point determining condition, and shooting condition.

If "YES" in the step S27, namely, when the slide input after determining starting point is moved to the outside of the second area 76, the CPU core 42 determines the input coordinates detected in the step S7 of the present frame as the ending point, and stores the input coordinates data in the ending point memory area 118. Also, in a step S31, the CPU core 42 stores the present frame number in the end frame number memory area 120. Thus, the time measurement for the moving speed is ended.

Since the input ending point condition to the ball 70 is satisfied, in a step S33, the CPU core 42 writes, for example, "0" in the input start flag memory area 130, and turns off the input start flag. In addition, since the shooting condition of the ball 70 is satisfied at the same time, in a step S35, the CPU core 42 writes, for example, "1" in the shooting flag memory area 132, and turns on the shooting flag. Thus, the movement of the ball 70 is started. After completion of the step S35, the process advances to the step S51 of FIG. 14.

Note that if "NO" in the step S27, namely, when the slide input after determining the starting point is not moved to the outside of the second area 76, the process advances to the step S51 of FIG. 14 as it is.

Figure 13:
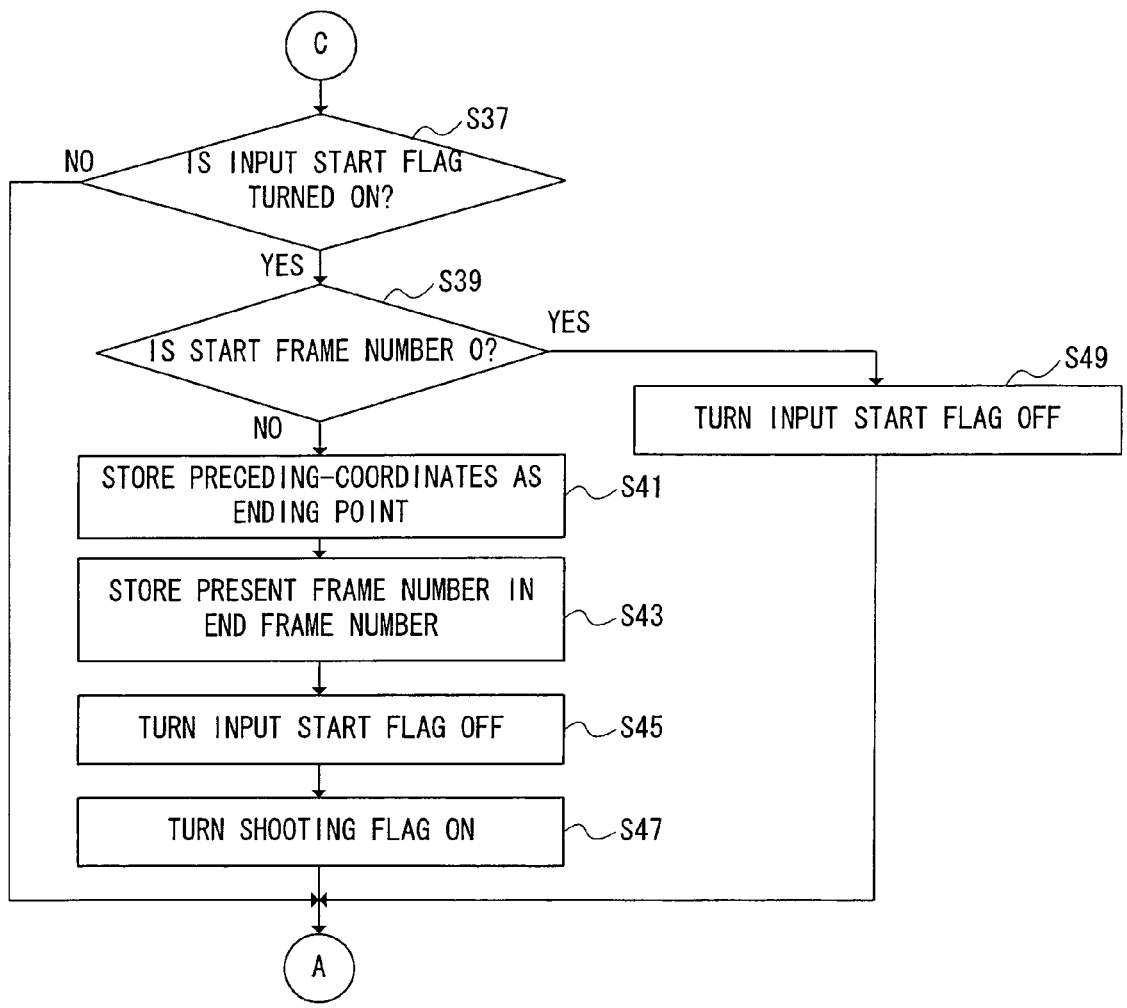
FIG. 13 is a flowchart showing other part of the continuance of FIG. 11.

When the input to the touch panel 22 is not detected, namely, if "NO" in the step S5, the CPU core 42 performs input history update in the step S25 as described above, and performs ending point determination by following the ending point determination program in the step S37 and a step S39 of FIG. 13. Namely, in the step S37, the CPU core 42 determines whether or not the input start flag is turned on, and if "YES", the CPU core 42 determines whether or not the start frame number is "0" in the step S39. In these steps, the CPU core 42 determines whether or not there is an input-off after the input to the ball 70 is started, and also determines whether or not there is the input-off after the time measurement is started.

If "NO" in the step S39, namely, when there is the input-off even at once after the slide input after determining the starting point is moved to the outside of the third area 78, the ending point condition is satisfied, and therefore the CPU core 42 determines the coordinate point detected immediately before the touch-off as the ending point, and stores the preceding-time coordinate data of the input history memory area 112 in the ending point memory area 118 in a step S41. Also, since the determining condition of the time measurement ending point is satisfied, the CPU core 42 stores the present frame number in the end frame number memory area 120 in a step S43. Thus, the time measurement for the moving speed is ended. Further, since the input to the ball 70 is ended, the CPU core 42 turns off the input start flag in a step S45. Also, since the shooting condition is satisfied, the CPU core 42 turns on the shooting flag in a step S47. After completion of the step S47, the process advances to the step S51 of FIG. 14.

Meanwhile, if "YES" in the step S39, namely, when there is the touch-off without allowing coordinates, that are continuously detected after determining the starting point, to be positioned outside of the third area 78, this is regarded as a cancel of this slide input, and the CPU core 42 turns off the input start flag in a step S49. After completion of the step S49, the process advances to the step S51 of FIG. 14.

In addition, if "NO" in the step S37, namely, when the input to the ball 70 is not started, the process advances to the step S51 of FIG. 14 as it is.

In the step S51 of FIG. 14, the CPU core 42 determines whether or not the shooting flag is turned on. If "YES" in the step S51, namely, when the shooting condition is satisfied, the CPU core 42 determines the moving direction of the ball 70, based on the center point of the ball 70 and the ending point, by following the moving direction determination program in a step S53. The center coordinates of the ball 70 are stored as the positional data corresponding to this ball 70 of the ball control data memory area 126, and the starting point coordinates are stored in the starting point memory area 114. For example, as described in FIG. 8, the CPU core 42 calculates the angle θ formed by the straight line connecting the center point of the ball 70 and the ending point and the predetermined direction of the operation surface of the touch panel 22, and determines a direction shown by this angle as the moving direction.

In addition, in a step S55, the CPU core 42 calculates a difference between a value of the end frame number memory area 120 and a value of the start frame number memory area 116 by following the moving speed program, and determines the moving speed based on this difference, namely, based on the time period elapsed from when the slide input is moved to the outside of the third area 78 for the first time to when it is moved to the outside of the second area 76.

Then, the CPU core 42 starts the execution of moving process for this ball 70 in a step S57. By executing the moving process by following the movement control program, this ball 70 is moved at a determined speed in a determined direction. This moving process is executed by each ball 70, and an example of the operation is shown in detail in FIG. 15 as will be described later. In addition, when the CPU core 42 starts the execution of the moving process in the step S57, it executes the processing of the moving process of FIG. 15 and the processing from FIG. 11 to FIG. 14 in parallel.

In the subsequent steps S59 to S65, the processing for a new ball 70 is performed. Namely, the CPU core 42 deletes the data of the start frame number memory area 116 and the data of the end frame number memory area 120 in the step S59. Further, in the step S61, the CPU core 42 stores, for example, "0" in the shooting flag memory area 130 and turns off the shooting flag.

Then, in the step S63, the CPU core 42 generates the data for the new ball 70 in the ball control data memory area 126. The identification number showing a predetermined image for the new ball 70 is set in the image designation data, and the data showing the predetermined position, namely the center coordinates of the first area 74 in this embodiment is set in the positional data.

Then, in the step S65, the CPU core 42 displays this new ball 70 in the center of the first area 74. Thus, the screen, in that the new ball 70 is generated at a predetermined position (center of the first area 74) after the existing ball 70 is moved, is displayed.

Note that in this embodiment, as soon as the movement of the ball 70 is started, this new ball 70 is generated. However, in other embodiment, the new ball 70 may be generated after a fixed time period elapsed from starting the movement of the ball 70.

After completion of the step S65, or if "NO" in the step S51, namely, when the shooting condition is not satisfied, the CPU core 42 controls the target 72 in a step S67. For example, the CPU core 42 updates as needed the positional data out of the control data of each target 72 of the target control data memory area 128, and displays the target 72 at a position thus updated.

Then, in a step S69, the CPU core 42 determines whether or not the game is over. If "NO" in the step S69, the process returns to the step S3 of FIG. 11, and the CPU core 42 executes the processing of the next frame. Meanwhile, if "YES" in the step S69, namely, when a game clear condition or a game over condition is satisfied, this game processing is ended.

Figure 15:
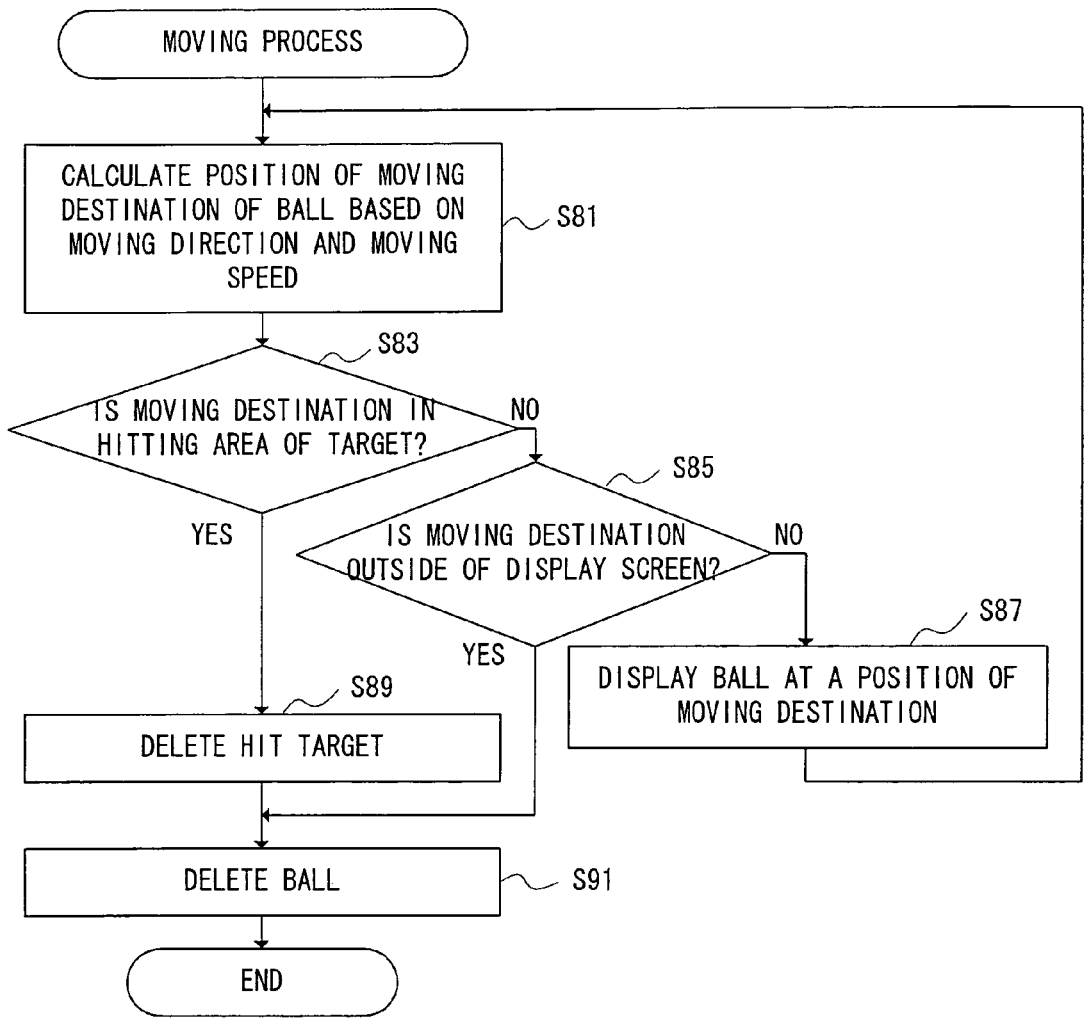
FIG. 15 is a flowchart showing an example of an operation of a moving process for each ball, the execution thereof is started in FIG. 14.

FIG. 15 shows an example of the operation of the moving process for each ball 70 started in the step S57 of FIG. 14. When the moving process is started, the CPU core 42 firstly calculates the coordinates of the position of a moving destination of this ball 70, based on the moving direction, the moving speed, and the present position in a step S81. Then, the CPU core 42 determines whether or not the position of the moving destination thus calculated is within a hitting area of the target 72 in a step S83. The hitting area of the target 72 is set in the display area of the target 72 and in the vicinity thereof, and for example, the data showing the hitting area may be stored in the target control data memory area 128, for each target 72.

If "NO" in the step S83, the CPU core 42 determines whether or not the position of the moving destination becomes the coordinates outside of the display screen in a step S85. If "NO" in the step S85, namely, when the ball 70 does not hit the target 72 and exists in the screen yet, the CPU core 42 updates the positional data out of the control data of this ball 70 to the data showing the coordinates of the moving destination thus calculated, and displays this ball 70 at a position of the moving destination in a step S87. Thus, the screen, in that this ball 70 moves in the determined moving direction and at the determined moving speed, is displayed. After completion of the step S87, the process returns to the step S81 and the CPU core 42 executes the processing of the next frame.

Meanwhile, if "YES" in the step S83, namely, when the ball 70 collides in the target 72, the CPU core 42 deletes the control data of the target 72, that is hit by the ball 70, from the target control data memory area 128, and also deletes the image data of this target 72 in VRAM 56 or 58 in a step S89. Thus, this target 72 is deleted from the screen.

After completion of a step S89, the process advances to a step S91. In addition, if "YES" in the step S85, namely, when the ball 70 does not hit the target 72 but moves outside of the range displayed on the screen, the process advances to the step S91.

In the step S91, the CPU core 42 deletes the control data of this ball 70 from the ball control data memory area 126, and also deletes the image data of this ball 70 in the VRAM 56 or 58. Thus, this ball 70 is deleted from the screen. After completion of the step S91, the CPU core 42 ends the moving process for this ball 70.

According to this embodiment, by detecting the coordinates in the first area 74 including the ball 70, the starting point of the input to this ball 70 is determined, and the second area 76 and the third area 78 for measuring the behavior of the slide input to the ball 70 are provided, with this starting point set as a reference. Then, the coordinates, when the slide input after determining the starting point is moved to the outside of the second area 76, are detected as the ending point of the input to the ball 70, and based on the ending point of this input and the position of the ball 70, the moving direction of the ball 70 is determined. In this way, the ending point of the input is determined based on the second area 76 provided on the operation surface, and therefore the range for receiving the input as the input to control the movement of the ball 70 can be clarified, namely the position of determining the ending point of the input can be clarified. Therefore, the ending point used in determining the moving direction can be determined as intended by the user, thus making it possible for the user to input a desired moving direction, and the ball 70 can be moved in a direction as intended by the user.

Also, the time point, when the slide input after determining the starting point is moved to the outside of the third area 78 for the first time, is determined as the time measurement starting point, and the time point when the slide input thereafter is moved to the outside of the second area 76 is determined as the time measurement ending point, and the moving speed is determined based on the elapsed time period from the starting point to the ending point. In this way, based on the second area 76 and the third area 78 provided on the operation surface, the starting point and the ending point of the input for the moving speed are determined, and therefore the range for receiving the input as the input to control the movement of the ball 70 can be clarified. For example, the user can hesitate to input within the third area 78 until the input direction is determined, and therefore it is possible to accurately measure the input after the user's determining how to move the stick or the like 24 at what speed and in what direction thereafter. Alternatively, the user can cancel the input by touch-off in the third area 78. Accordingly, as the user's intention, the starting point and the ending point of the time measurement for the moving speed can be determined, thus making it possible to move the ball 70 at a speed as intended by the user.

Also, after the starting point of the input to the ball 70 is determined, the second area 76 and the third area 78 are provided, with the starting point set as a reference. Namely, the second area 76 and the third area 78 for measuring the slide input thereafter can be set at a place corresponding to the start position of the input to the ball 70 by the user. Accordingly, the behavior of the input by the user can be more accurately grasped, and therefore the intention of the user can be more exactly reflected on the movement control of the ball 70.

In addition, the starting point is determined in accordance with the point that the coordinates in the first area 74 are detected in a state of not starting the input to the ball 70, and the ending point is determined in accordance with the point that the slide input thereafter is moved to the outside of the second area 76, and the ball 70 is thereby moved. Accordingly, the user can sequentially move a plurality of balls 70, without switching input-state or no-input state, namely, while touch on the touch panel 22 is continued. In this way, since the operability is excellent, the user can easily move even the plurality of balls 70, as his/her intention.

Note that according to the aforementioned embodiment, the first area 74 for determining the input to the ball 70 includes the region of the display area of the ball 70 and the area in the vicinity thereof, and is formed in a size slightly larger than the ball 70. However, in other embodiment, the first area 74 may be set same as the display area of the ball 70. In this case, in order to move the ball 70, it is possible to request the user to touch on the ball 70, namely, it is possible to request the user to give accurate input to the ball 70. Therefore, the input having the user's intention accurately reflected thereon can be measured.

In addition, according to the aforementioned each embodiment, the moving direction is determined based on the position (center coordinates) of the ball 70 and the ending point of the input. Namely, the ball 70 is moved toward the coordinate point when the slide input is moved to the outside of the second area 76. However, according to other embodiment, the moving direction may be determined based on the starting point and the ending point of the input. In this case, the ball 70 can be moved in a direction that the slide input is moved, namely, in a direction from the starting point toward the ending point. Note that in this case, the starting point for determining the moving direction may not be the detection coordinates when the input is given in the first area 74, but may be the detection coordinates when the slide input after confirming the input in the first area 74 is moved to the outside of the third area 78, namely, may be the detection coordinates when the time measurement starting point is determined.

In addition, in the aforementioned each embodiment, only the coordinates of the. starting point and the ending point out of the slide input to the ball 70 by the user are stored, to set the second area 76, etc. and calculate the moving direction. However, in other embodiment, it may be so designed that the locus of the slide input to the ball 70 is stored, and the moving direction is determined based on the coordinates on the locus.

In the aforementioned each embodiment, in accordance with the determination of the starting point of the input, the second area 76 and the third area 78 are set, with this starting point set as a reference. However, in other embodiment, in the same way as the first area 74, the second area 76 and/or the third area 78 may be provided beforehand, with a predetermined position set as reference. In this case, in the same way as the first area 74, reference coordinates (center coordinates in case of a circular form) of the second area 76 and/or the third area 78 may be set at the positional coordinates (center coordinates in a case of a circular form) of the ball 70.

Also, in the aforementioned each embodiment, the first area 74 for determining the input to the ball 70 and the third area 78 corresponding to the determination area of the time measurement starting point are separately provided. However, in other embodiment, the third area 78 may be set so as to be identical to the first area 74. Namely, the first area 74 may correspond to the determination area of the input to the ball 70 and also correspond to the determination area of the time measurement starting point.

For example, in the next embodiment explained with reference to FIG. 16 to FIG. 25, the first area 74 for determining the input to the ball 70 is also used for the area for determining the time measurement starting point. In addition, the second area 76 for determining the ending point of the input is provided beforehand, with the center of the ball 70 set as a reference. Also, in this embodiment, the locus of the slide input is acquired, to determine the moving direction of the ball 70.

Figure 16:
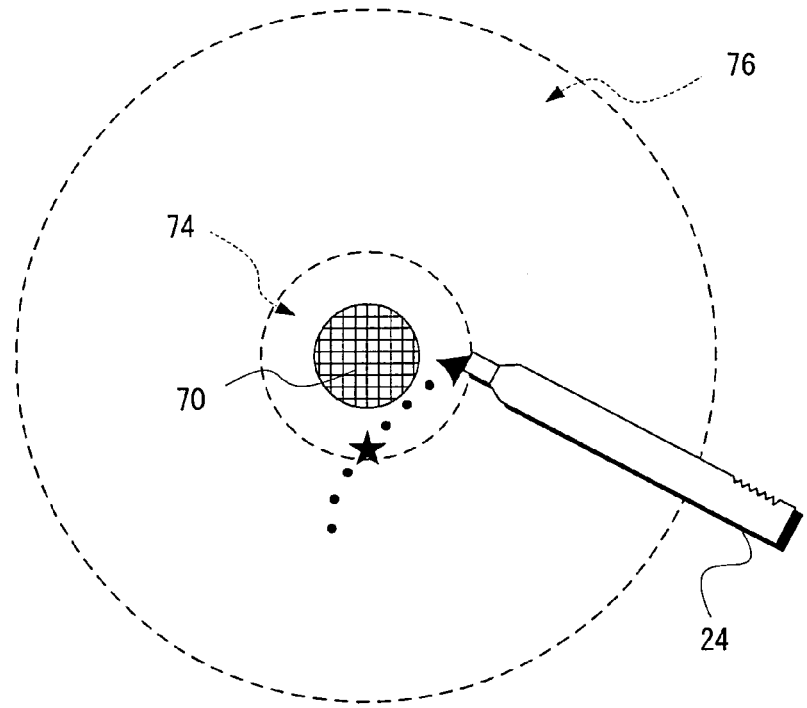
FIG. 16 is an illustrative view for explaining the determination of the starting point of the input and the second area in other embodiment.

Specifically, according to FIG. 16, the first area 74 and the second area 76 are provided beforehand on the operation surface. The center coordinates of the second area 76 are set same as the center coordinates of the first area 74, and the second area 76 is provided so as to encompass the first area 74.

In this embodiment, as will be described later, the moving direction is determined based on the coordinates detected in a period from when the input is started to the first area 74 to when the slide input is moved to the outside of the range of the second area 76. Accordingly, the second area 76 is set in an appropriate size, so as to exactly grasp the user's intention of the slide input to the ball 70. The radius data of the second area 76 may be set in the same amount of value as that of the aforementioned embodiment.

As shown in FIG. 16, when the input to the first area 74 is detected, this is regarded as a start of the input for moving the ball 70, and acquisition of an input locus is started. Namely, when it is detected that the input coordinates by the stick or the like 24 correspond to the coordinates in the first area 74, the coordinate point is determined as the starting point, and continuous coordinates by the slide input thereafter are stored as the input locus. Note that FIG. 16 shows a case where the starting point of the input is determined when continuous input, that is taking place, enters into the first area 74. However, the input may be started in the first area 74, as the determining condition of the starting point. Thereafter, when the slide input is moved to the outside of the second area 76, the acquisition of the locus is ended, and the detection coordinates at that time become the ending point. The moving direction of the ball 70 is determined based on at least two points out of a plurality of coordinate points from the starting point to the ending point of the input locus, for example, based on the starting point and the ending point.

Figure 17:
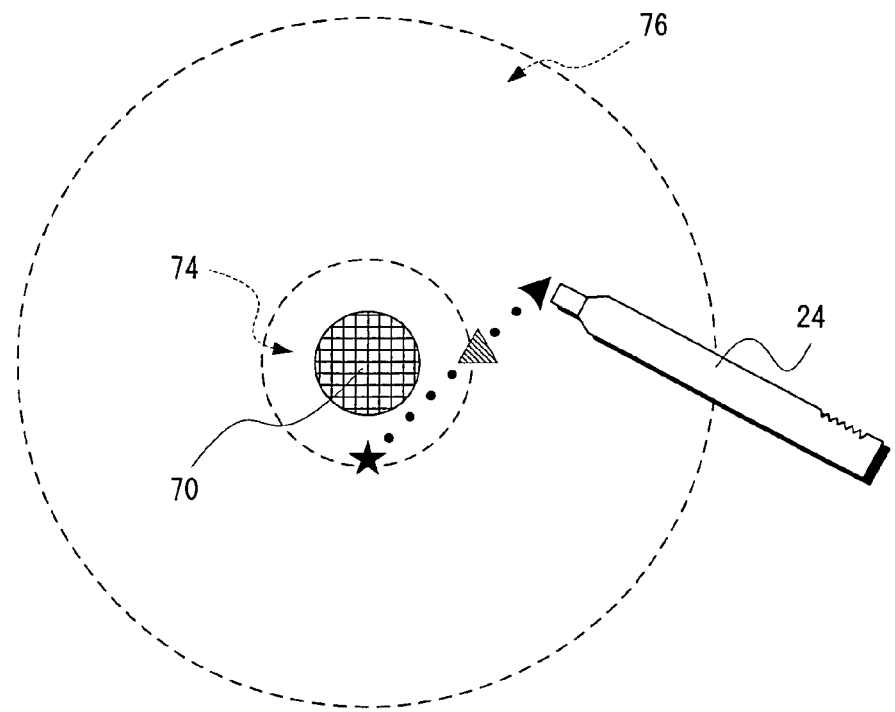
FIG. 17 is an illustrative view for explaining the determination of the time measurement starting point in other embodiment.

Thereafter, as shown in FIG. 17, when the coordinates continuously detected after determining the starting point of the locus are the coordinates positioned outside of the first area 74, the time measurement starting point for the moving speed is determined. Note that in this embodiment, the first area 74 corresponds to the play area in that the user can hesitate to input. For example, in a case where the touch-off occurs before the input is given to the outside of the first area 74, this case is regarded as the cancel of the input.

Figure 18:
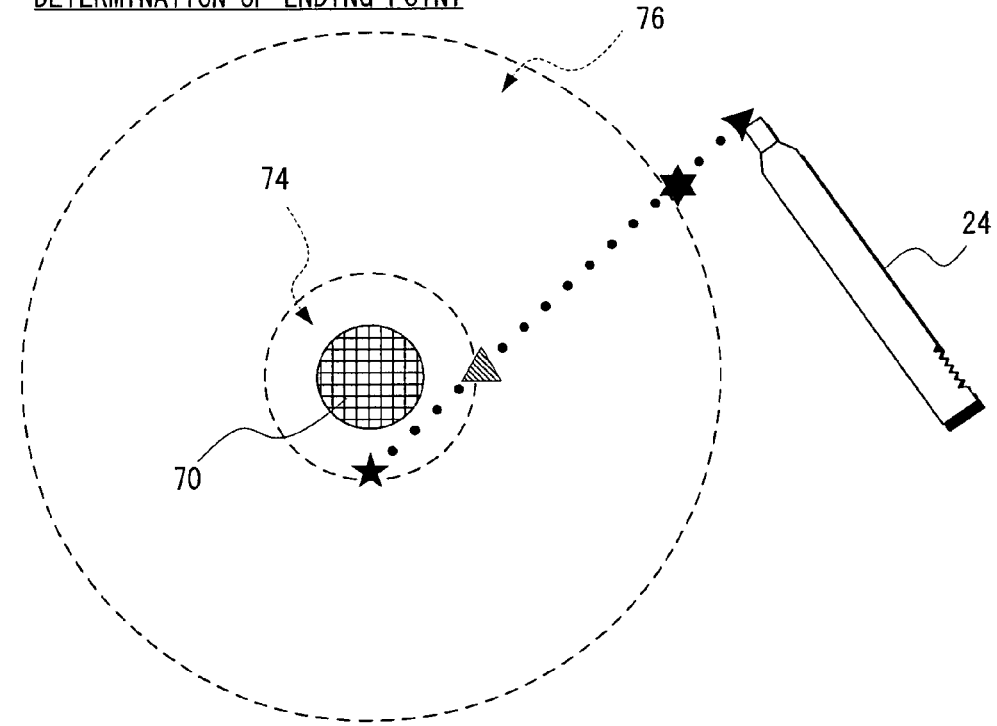
FIG. 18 is an illustrative view for explaining the determination of the ending point in other embodiment.

Then, as shown in FIG. 18, when the coordinates continuously detected after determining the starting point of the locus are the coordinates positioned outside of the second area 76, this coordinate point is determined as the ending point, and the acquisition of the input locus is ended. At the same time, the time measurement ending point for the moving speed is determined.

Although not shown, when the slide input after determining the starting point of the locus is touched-off in the second area 76, namely, when stop of the continuous coordinates after determining the starting point in the second area 76 is detected, the acquisition of the input locus for the moving direction is ended. In this case, the ending point of the input locus is the coordinate point detected immediately before the touch-off. In addition, the time measurement for the moving speed is ended, and the frame number, when the touch-off is detected, is stored as the measurement ending point. Since the ending point is determined by ending the input outside of the first area 74, and therefore the movement of the ball 70 can be quickly started.

Note that in a case that the slide input is moved into the first area 74 again, before moving to the outside of the first area 74 and outside of the second area 76, this case is regarded as the cancel of the input in this embodiment, and the detection coordinates at this time are determined to be the starting point, and the acquisition of the input locus is started over.

Figure 19:
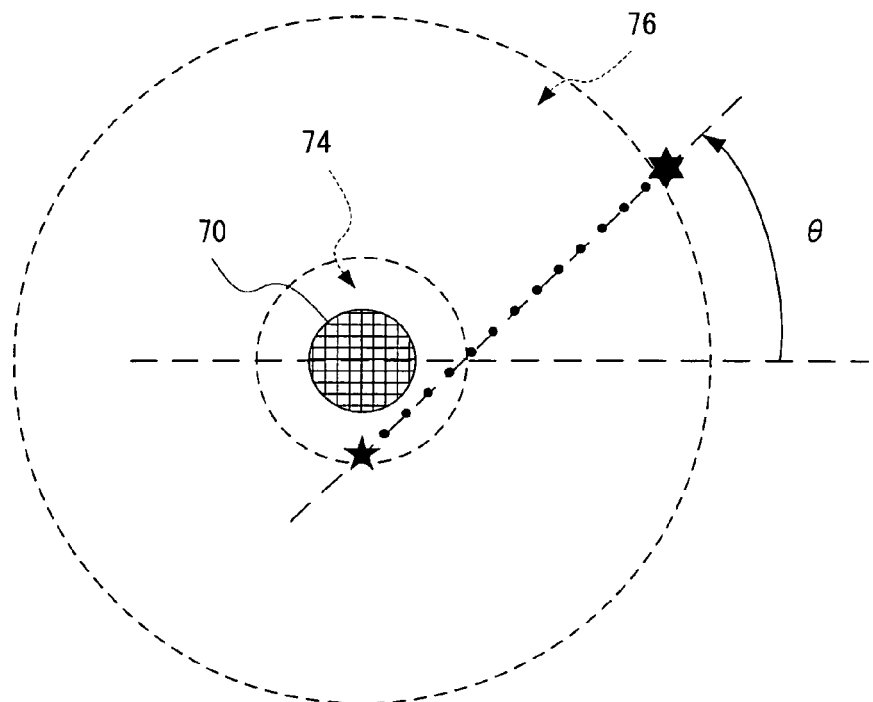
FIG. 19 is an illustrative view for explaining an example of a determination method of the moving direction based on an input locus in other embodiment.

Also, in a case that the slide input is moved to the outside of the second area 76, this case is a movement start timing of the ball 70. The moving direction and the moving speed are determined, and the movement of the ball 70 in accordance with these moving direction and moving speed is started. As shown in FIG. 19, the moving direction is determined based on the input locus. For example, the moving direction may be determined based on the coordinates of at least two points of the input locus. Specifically, the angle θ formed by the straight line connecting the starting point and the ending point in the input locus and a predetermined direction (such as horizontal direction) of the operation surface may be determined as the moving direction. Alternatively, the moving direction may be the angle formed by the straight line connecting the ending point and the coordinate point immediately before the ending point in the input locus and the predetermined direction, or may be an average value of the angle formed by each straight line connecting adjacent coordinate points in the input locus and the predetermined direction. Alternatively, the moving direction may be determined based on the detection coordinates when the slide input is moved to the outside of the first area 74, namely, the detection coordinates when the time measurement starting point is determined, and the ending point. In this case, the moving direction and the moving speed are determined based on the same detection time point.

Figure 20:
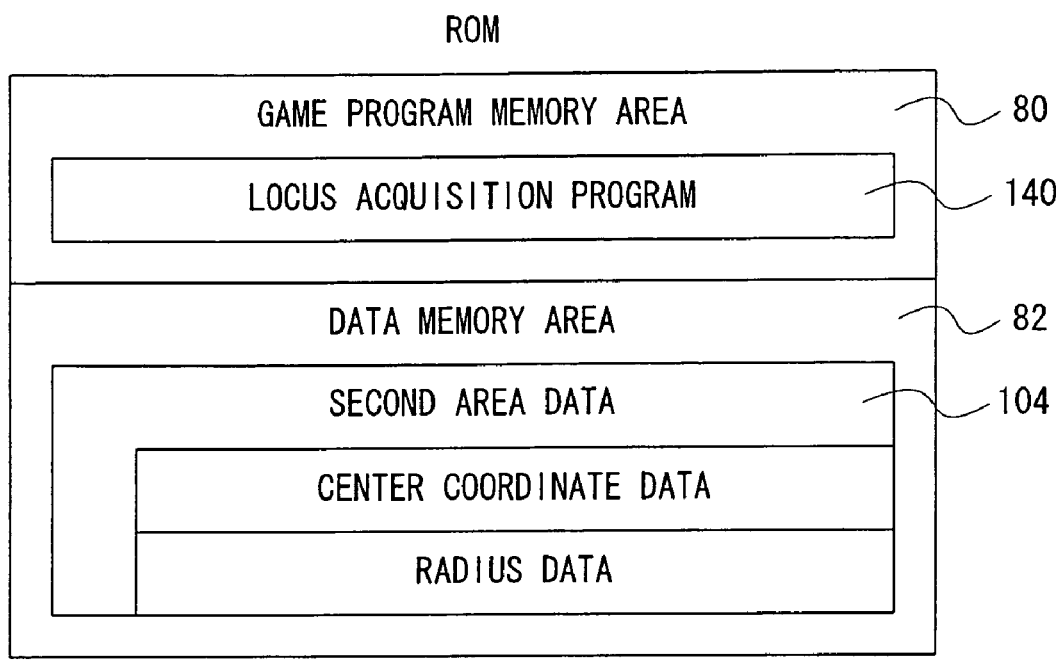
FIG. 20 is an illustrative view showing a part of the memory map of the ROM in other embodiment.

FIG. 20 shows a part of the memory map of the ROM 28a. A locus acquisition program is stored in the memory area 140. By this program, the locus of the slide input to the ball 70 by the user is acquired. Specifically, the coordinates, when the determining condition of the starting point of the input is satisfied by following the starting point determination program, are stored as the starting point of the locus. Further, a plurality of coordinates continuously detected subsequently to the starting point is stored. The input locus is acquired until it is determined that the determining condition of the ending point of the input is satisfied by following the ending point determination program.

In addition, the second area 76 is provided beforehand, and further the data showing a reference point of the second area 76 is stored beforehand in the second area data memory area 140. In a case of the circular second area 76, the center coordinate data is stored together with the radius data.

Figure 21:
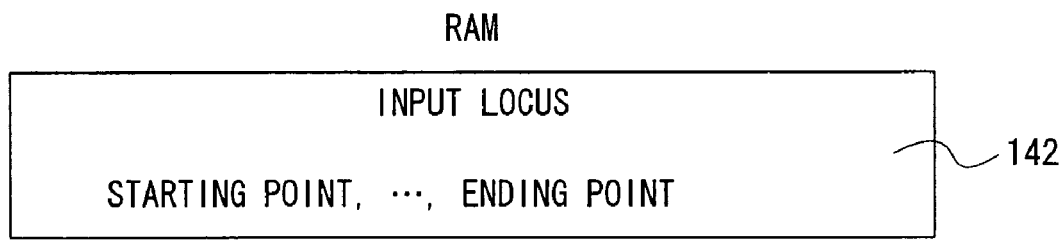
FIG. 21 is an illustrative view showing a part of the memory map of the RAM in other embodiment.

Also, FIG. 21 shows a part of the memory map of the RAM 48. The coordinate data of a plurality of coordinate points showing the locus by the slide input acquired by executing the locus acquisition program is stored in an input locus memory area 142. A plurality of coordinates from the input coordinate (i.e. the starting point) when it is determined that the starting point condition is satisfied by executing the starting point determination program, to the input coordinates (i.e. the ending point) when it is determined that the ending point condition is satisfied by executing the ending point determination program, are stored.

FIG. 22 to FIG. 25 show an example of the operation of the game apparatus 10 according to this embodiment. When the game processing is started, the CPU core 42 firstly generates the game screen including the ball 70 and the target 72, and displays it on the LCD 14 in a step S101. In the same way as the aforementioned embodiment, the CPU core 42 repeatedly executes the processing from subsequent steps S103 to S185 (FIG. 25) for every fixed time (such as 1 frame).

In the step S103, the CPU core 42 acquires the input data from the touch panel 22 in the RAM 48 through the I/F circuit 54. Subsequently, in a step S105, the CPU core 42 determines whether or not the input is given based on the input data.

If "YES" in the step S105, the CPU core 42 detects the coordinate data showing the input coordinates from the input data, and stores it in the input coordinate memory area 110 in a step S107. In a subsequent step S109, the CPU core 42 stores the input history. For example, in the input history memory area 112, the CPU core 42 writes the data of the memory area of this-time coordinates in the memory area of the preceding-time coordinates, and writes the data of the input coordinates memory area 110 in the memory area of this-time coordinates.

Then, in the subsequent steps S111 to S115, the CPU core 42 determines whether or not the starting point determining condition is satisfied, by following the starting point determination program. Namely, the CPU core 42 determines whether or not the input coordinates are the coordinates in the first area 74, based on the data of the input coordinate memory area 110 and the data of the first area data memory area 102, etc. in the step S111. If "YES" in the step S111, the CPU core 42 determines whether or not the input changes from an off-state to an on-state, based on the input history data in a step S113. For example, with reference to the data of the input history memory area 112, the CPU core 42 determines whether or not the data showing no-input state is stored in the preceding-time coordinates and the coordinate data is stored in this-time coordinates. If "YES" in the step S113, namely, when the input is started in the first area 74, the starting point determining condition is satisfied, and therefore the process advances to a step S121.

Meanwhile, if "NO" in the step S113, namely, when continuous touching is taking place, the CPU core 42 determines whether or not the preceding-time coordinates are the coordinates outside of the first area 74, based on the data showing the preceding-time coordinates of the input history memory area 112 and the first area data, etc. in the step S115. If "YES" in the step S115, namely, when the slide input is moved into the first area 74 from outside of the first area 74, the starting point determining condition shown in FIG. 16 is satisfied. Therefore, in order to start the acquisition of the input locus, the CPU core 42 deletes the data of the input locus memory area 142 in a step S117, and deletes the data of the start frame number memory area 116 to set the initial value in a step S119. Here, for example, although the slide input is given in the second area 76, the acquisition of the input locus and the time measurement are required to be started over when the slide input is moved to the inside of the first area 74 before it is moved to the outside of the second area 76, thus clearing each memory area.

Subsequently, in the step S121, the CPU core 42 stores the input coordinates of the input coordinate memory area 110 in the input locus memory area 142. Thus, the starting point of the input locus is stored. Then, in a step S123, the CPU core 42 turns on the input start flag. After completion of the step S123, the process advances to a step S165 of FIG. 25.

Meanwhile, if "NO" in the step S115, namely, when the continuous input after determining the starting point is given in the first area 74, the CPU core 42 adds the input coordinates of the input coordinate memory area 110 to the input locus memory area 142, and stores it as the input locus in a step S125. After completion of the step S125, the process advances to the step S165 of FIG. 25.

Figure 23:
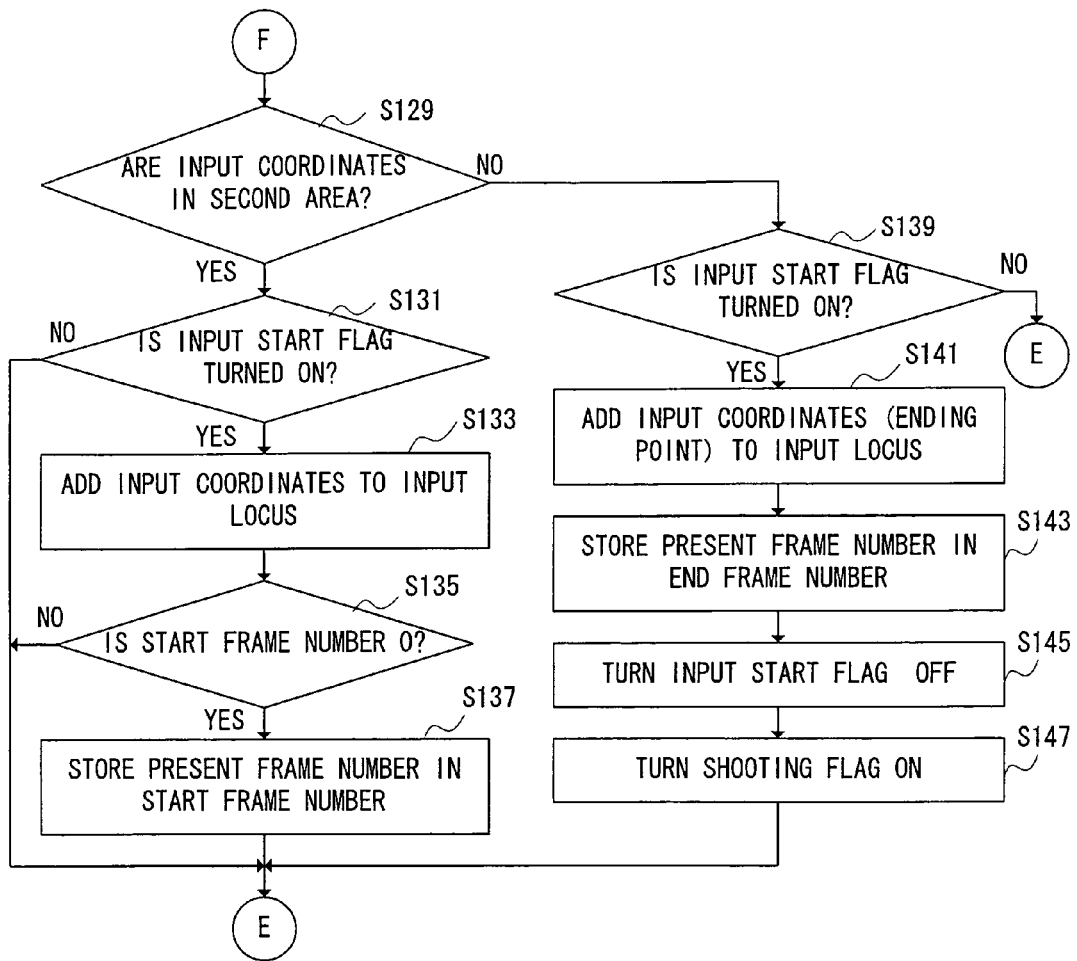
FIG. 23 is a flowchart showing a part of the continuance of FIG. 22.

Also, if "NO" in the step S111, namely when the outside of the first area 74 is touched, the process advances to a step S129 of FIG. 23.

Also, if "NO" in the step S105, namely, when the input is not given in the touch panel 22, in a step S127, the CPU core 42 stores the input history. Namely, in the input history memory area 112, the CPU core 42 stores the data stored in the memory area of this-time coordinates in the memory area of the preceding-time coordinates, and stores the data showing no-input state in the memory area of this-time coordinates. After completion of the step S127, the process advances to a step S149 of FIG. 24.

When the outside of the first area 74 is touched, the CPU core 42 determines whether or not the input coordinates are the coordinates inside of the second area 76, based on the data of the input coordinates and the data of the second area data memory area 104, etc. in the step S129 of the next FIG. 23. If "YES" in the step S129, the CPU core 42 determines whether or not the input start flag is turned on in a step S131. If "YES" in the step S131, namely, when the continuous input after determining the starting point is given in the second area 76, the CPU core 42 adds the data of the input coordinate memory area 110 to the input locus memory area 142 in a step S133.

In a subsequent step S135, the CPU core 42 determines whether or not the determining condition of the time measurement starting point for the moving speed is satisfied. Namely, in the step S135, the CPU core 42 determines whether or not an initial value zero is stored in the start frame number memory area 116. Namely, here, the CPU core 42 determines whether or not the slide input after determining the starting point is moved into the second area 76 for the first time. If "YES" in the step S135, the starting point determining condition of FIG. 17 is satisfied. Therefore, the CPU core 42 stores the present frame number in the start frame number memory area 116 in a step S137. After completion of the step S137, the process advances to the step S165 of FIG. 25.

Figure 25:
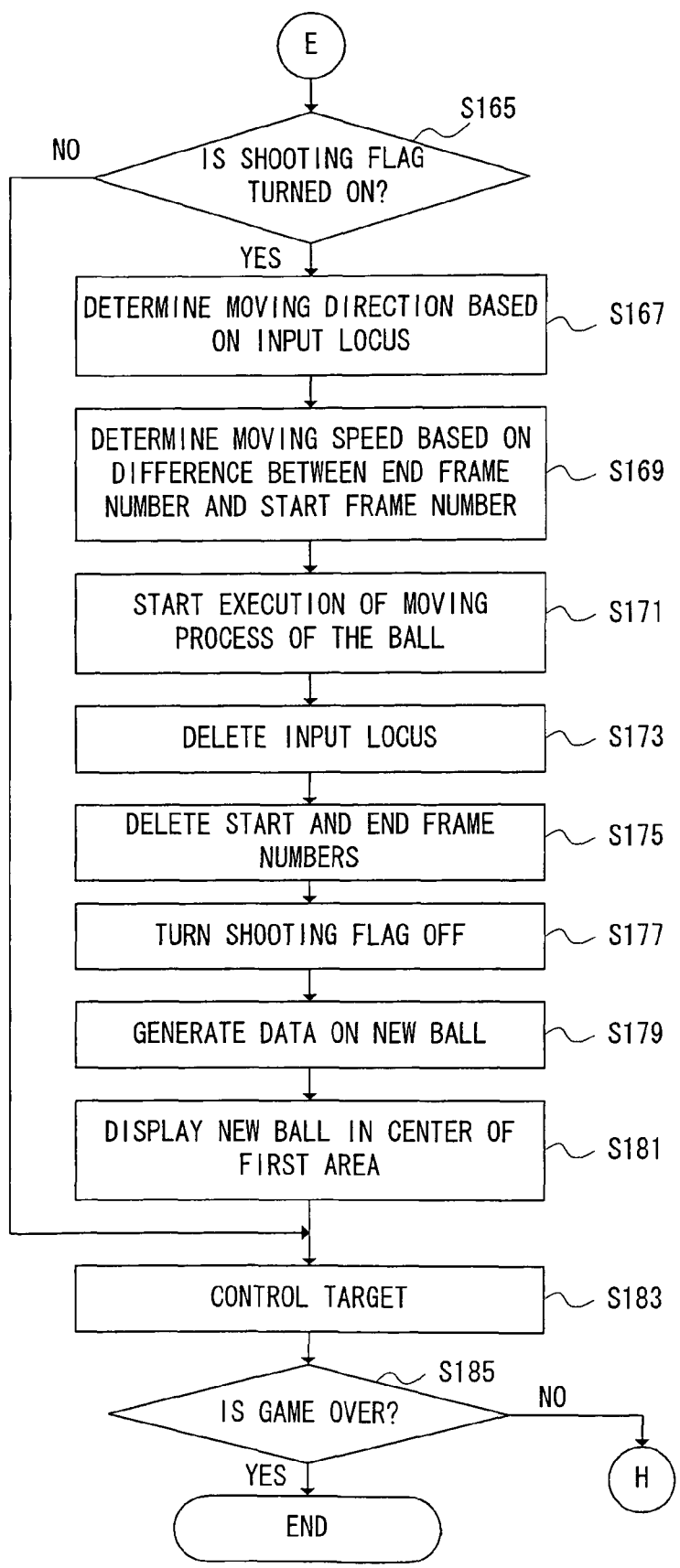
FIG. 25 is a flowchart showing the continuance of FIG. 22, FIG. 23 and FIG. 24.

Note that if "NO" in the step S135, namely, when the time measurement for the moving speed is already started, the process advances to the step S165 of FIG. 25 as it is. Also, if "NO" in the step S131, namely, even when only the inside of the second area 76 is touched without satisfying the starting point determining condition, the process advances to the step S165 of FIG. 25 as it is.

Meanwhile, if "NO" in the step S129, namely, when the outside of the second area 76 is touched, the CPU core 42 determines whether or not the ending point determining condition as shown in FIG. 18 is satisfied, by following the ending point determination program in the next step S139. Namely, the CPU core 42 determines whether or not the input start flag is turned on in the step S139. Namely, the CPU core 42 determines whether or not the slide input after determining the starting point is moved to the outside of the second area 76 for the first time.

If "YES" in the step S139, namely, when the CPU core 42 determines that the ending point condition is satisfied, the CPU core 42 adds the input coordinates of the input coordinate memory area 110 to the input locus memory area 142 in a step S141. The coordinates thus added become the ending point of the input locus.

In addition, in a step S143, the CPU core 42 stores the present frame number in the end frame number memory area 118. Further, in a step S145, the CPU core 42 turns off the input start flag. Thus, the acquisition of the input locus is ended. Further, in a step S147, the CPU core 42 turns on the shooting flag, because the shooting condition of the ball 70 is satisfied. After completion of the step S147, the process advances to the step S165 of FIG. 25.

In addition, if "NO" in the step S139, namely, when the outside of the second area 76 is touched regardless of the input to the ball 70, the process advances to the step S165 of FIG. 2 as it is.

Figure 22:
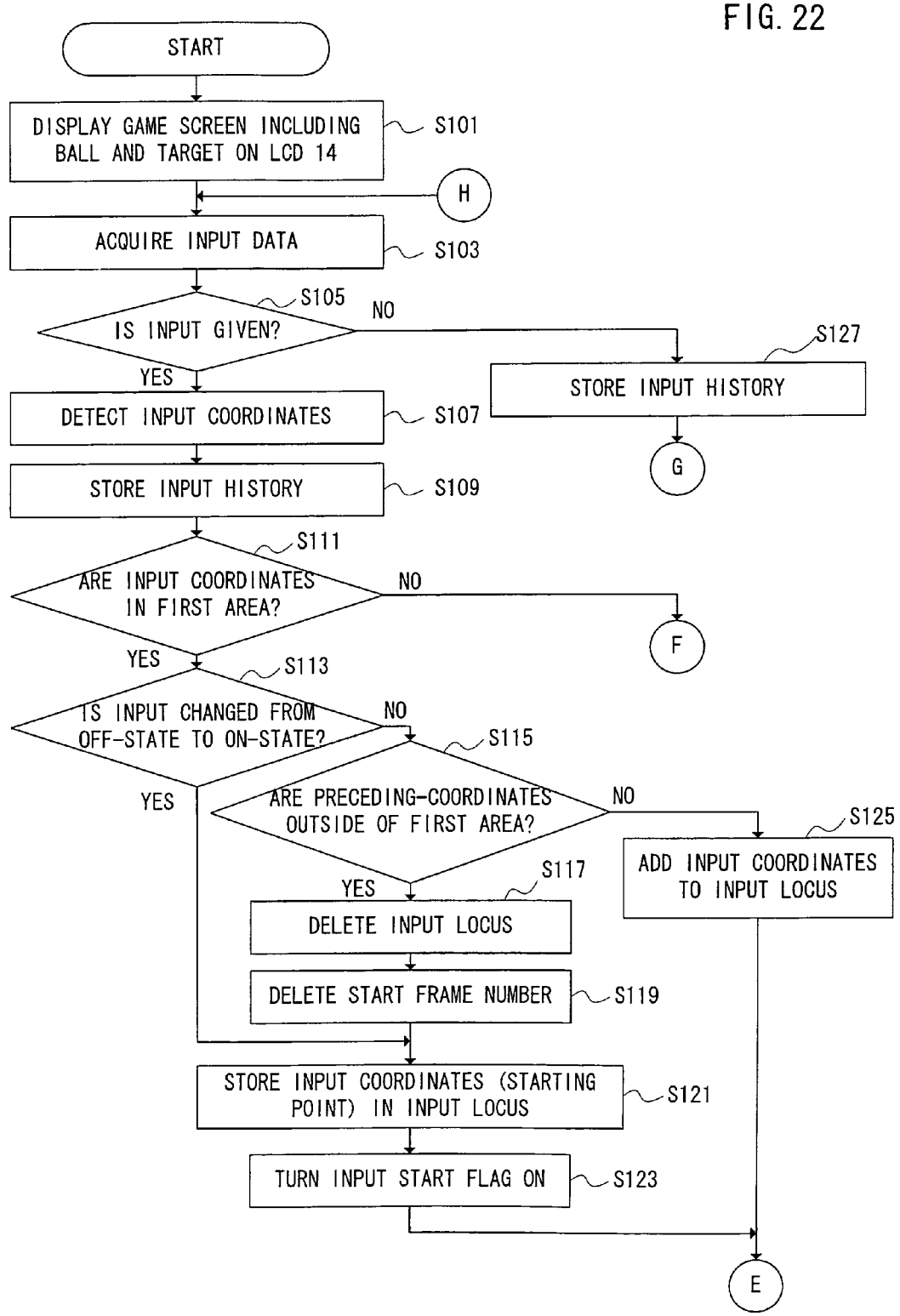
FIG. 22 is a flowchart showing a part of an example of an operation of a game apparatus according to another embodiment.
Figure 24:
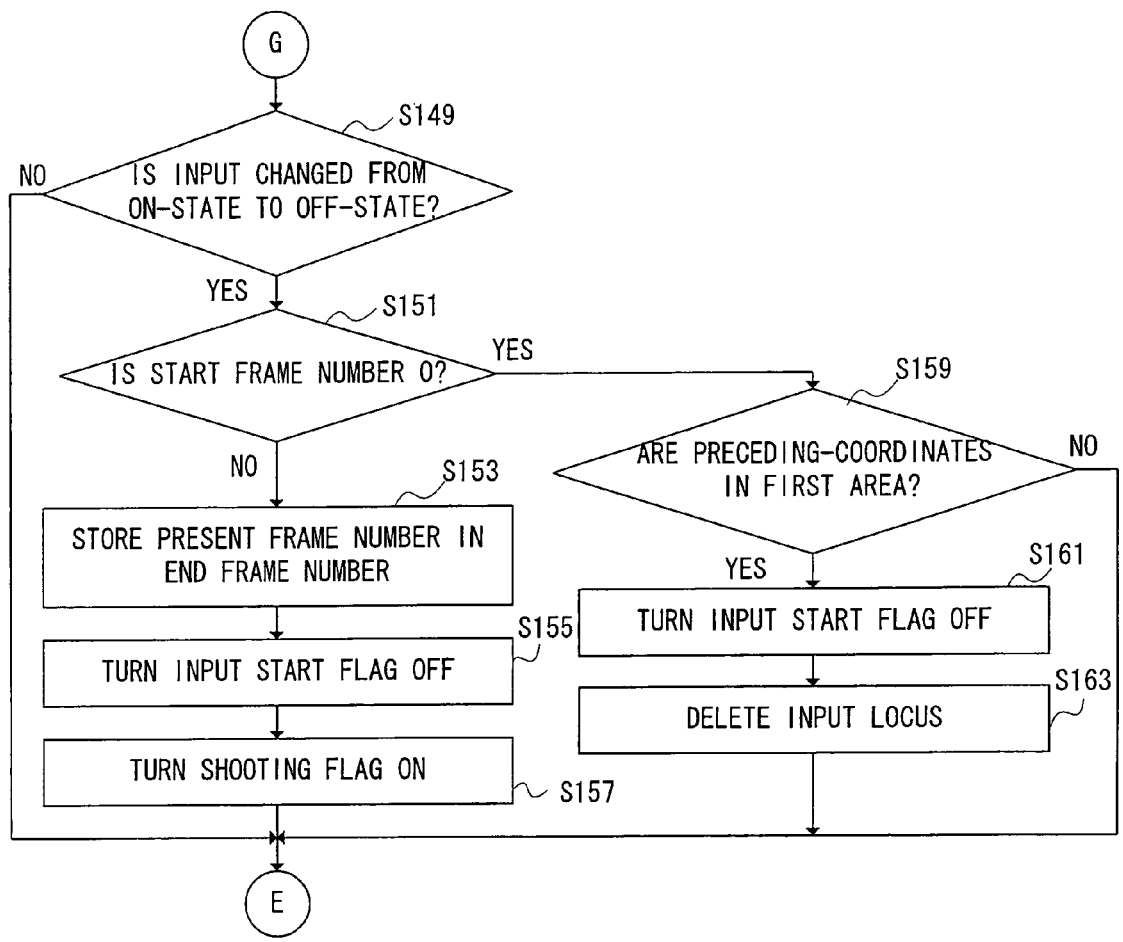
FIG. 24 is a flowchart showing other part of the continuance of FIG. 22.

If "NO" in the step S105 of FIG. 22, namely, when the input is not given, after updating the input history in the step S127, the CPU core 42 performs ending point determination based on the touch-off in the steps S149 and S151 of FIG. 24. Namely, in the step S149, the CPU core 42 determines whether or not the input is changed from on-state to off-state, based on the data of the input history memory area 112. If "YES" in the step S149, namely, when the stick or the like 24 has just been released from the touch panel 22, the CPU core 42 determines whether or not the start frame number memory area 116 is zero in the step S151. Here, whether or not the slide input is moved to the outside of the first area 74 is determined.

If "NO" in the step S151, namely, when the input is turned off when the slide input after determining the starting point is moved to the outside of the first area 74, in a step S153, the CPU core 42 stores the present frame number in the end frame number memory area 118, because the ending point condition is satisfied. In addition, the CPU core 42 turns on the input start flag in a step S155. Note that the ending point of the input locus is already stored in the memory area 142 by the processing of the step S133 (FIG. 23) of the frame of the preceding time. Further, in a step S157, the CPU core 42 turns on the shooting flag. After completion of the step S157, the process advances to the step S165 of FIG. 25.

Meanwhile, if "YES" in the step S151, the CPU core 42 determines whether or not the preceding-time coordinates are the coordinates inside of the first area 74, based on the input history data in a step S159. Here, it is determined whether or not the slide input is ended in the first area 74. If "YES" in the step S159, this is regarded as the cancel of the slide input, and the CPU core 42 turns off the input start flag in a step S161. In addition, in a step S163, the CPU core 42 deletes the data of the input locus memory area 142. After completion of the step S163, the process advances to the step S165 of FIG. 25.

Also, when the CPU core 42 shows "NO" in the step S159, namely, when the stick or the like 24, is released from the touch panel 22 in a stage of not starting the input to the ball 70, the process advances to the step S165 of FIG. 25 as it is. Also, if "NO" in the step S149, namely, when a no-input state continues, the process advances to the step S165 of FIG. 25 as it is.

In the step S165 of FIG. 25, the CPU core 42 determines whether or not the shooting flag is turned on. If "YES" in the step S165, the CPU core 42 determines the moving direction, based on the data of the input locus memory area 142 in a step S167. For example, as shown in FIG. 19, the CPU core 42 calculates the angle θ formed by the straight line connecting the starting point and the ending point of the input locus and the predetermined direction of the operation surface of the touch panel 22, and determines the direction shown by this angle as the moving direction.

In addition, in a step S169, the CPU core 42 calculates the difference between the end frame number and the start frame number, and determines the moving speed based on the difference.

Then, the CPU core 42 starts the execution of the moving process for the ball 70 in a step S171, and thus this ball 70 is moved at a determined speed in a determined direction. The operation of the moving process is the same as that of FIG. 15 as described above.

In the subsequent steps S173 to S181, the processing for another ball 70 is performed. Namely, the CPU core 42 deletes the data of the input locus memory area 142 in the step S173. In addition, the CPU core 42 deletes the data of the start frame number memory area 116 and the end frame number memory area 120 in a step S175. Further, the CPU core 42 turns off the shooting flag in a step S177.

Subsequently, in a step S179, the CPU core 42 generates the data for a new ball 70 in the ball control data memory area 120. Then, in the step S181, the CPU core 42 displays this new ball 70 in the center of the first area 74. Thus, the screen is displayed in that the new ball 70 is generated at a predetermined position after the existing ball 70 is moved.

When completing the step S181, or if "NO" in the step S165, the CPU core 42 controls the target 72 in a step S183, and for example, updates the positional data out of the control data of each target 72 as needed, and displays this target 72 at a position thus updated.

Subsequently, in the step S185, the CPU core 42 determines whether or not the game is over, and if "NO", the process returns to the step S103 of FIG. 22 and the CPU core 42 executes the processing of the next frame. Meanwhile, if "YES" in the step S185, the game processing is ended.

According to this embodiment, when the coordinates in the first area 74, in that the ball 70 is displayed, is detected, the acquisition of the input locus is started, and when the continuous coordinates thereafter are positioned outside of the second area 76, the acquisition of the input locus is ended. Then, the moving direction of the ball 70 is determined, based on at least two points out of a plurality of coordinate points acquired in a period from when the coordinates in the first area 74 are detected to when the coordinates outside of the second area 76 are detected, and the ball 70 is moved in the direction thus determined. In addition, the time point, when the slide input, after determining the starting point is moved to the outside of the first area 74, is determined as the time measurement starting point, and the time point, when the slide input thereafter is moved to the outside of the second area 76, is determined as the time measurement ending point. Then, based on the elapsed time period from the starting point to the ending point, the moving speed is determined. Thus, based on the first area 74 and the second area 76 provided on the operation surface, the starting point and the ending point of the input are determined. Therefore, in the same way as the aforementioned embodiment, the range of the input area for the moving control of the ball 70 can be clarified. Accordingly, it is possible to determine the starting point and the ending point of the input locus used in determining the moving direction, and the measurement starting point and the ending point used in determining the moving speed, as intended by the user. Therefore, the user can input desired moving direction and moving speed, and the ball 70 can be moved as intended by the user.

In addition, the movement of the ball 70 is controlled in accordance with an entry and an exit of the slide input into/from the first area 74 and the second area 76, and when the existing ball 70 is moved, the new ball 70 is generated. Therefore, in the same way as the aforementioned embodiment, the user can sequentially move a plurality of balls 70 without switching the input-state or no-input state.

Also, since the moving direction is determined based on the input locus, the input in various directions can be performed by the user by properly adjusting the size of the second area 76, for example. For example, when the second area 76 is made large, it becomes possible to input a complicated locus, in a period from when the continuous input is given in the inside of the first area 74 to when it is given to the outside of the second area 76. Alternatively, under inputting, the direction of the input locus can be fine-adjusted. Thus, more complicated moving direction can be inputted, and for example, the ball 70 can be controlled to move more complicatedly. Meanwhile, when the first area 74 and the second area 76 are made small, the moving direction is determined by the input of a small number of coordinates. This contributes to moving a plurality of balls 70 sequentially.

Note that in the aforementioned each embodiment, the second area 76 is provided so as to surround the overall circumference of the first area 74. Thus, the moving direction of the ball 70 can be determined in the whole directions of 360°. However, the second area 76 is provided for determining the ending point of the input, and by using this ending point, the moving direction is determined. Therefore, the second area 76 may be provided, so that the edge of the second area 76 is allowed to exist between the ball 70 or the first area 74, and a destination (target 72). Namely, a method of setting the second area 76 with respect to the first area 74 can be appropriately changed. For example, as shown in FIG. 26(A), the second area 76 may not surround the overall circumference of the first area 74. The second area 76 of FIG. 26(A) is provided so as to cover only the upper side 180° direction of the first area 74. For example, when the moving direction is determined based on the center point of the ball 70 and the ending point, the upper side 180° of the ball 70 can be the moving direction, and therefore this can be applied to a scene in that the arrangement of the target 72 is limited only to the upper side of the ball 70. Also, in the aforementioned each embodiment, the second area 76 is provided so as to encompass the first area 74. However, as shown in FIG. 26(B), the second area 76 may not encompass the first area 74. The second area 76 of FIG. 26(B) has a rectangular shape extending long in the horizontal direction, and is provided at a position separated from the first area 74. For example, when the moving direction is determined based on the starting point and the ending point, directions of all straight lines connecting each coordinate point in the first area 74 and each coordinate point on the peripheral edge of the second area 76 can be the moving directions. The second area 76 can be arranged at a prescribed position capable of determining the moving direction whereby the ball 70 is allowed to move in a direction of the target 72, with a predetermined position (such as center coordinates) in the first area 74 as a reference. The second area 76 is separated from the first area 74, and therefore the condition of determining the ending point of the input is that the slide input is moved to the inside of the second area 76 and then is moved to the outside of the second area 76.

Also, in the aforementioned each embodiment, the ball 70 is displayed from the first in a step S1 (FIG. 11) or the step S101 (FIG. 22). However, a display timing of the ball 70 can be properly changed. In other embodiment, for example, when the input to the touch panel 22 is started, the ball 70 may be displayed at a predetermined position or an input position or the like. Alternatively, when the moving direction is determined, the ball 70 may be displayed at the predetermined position, at the input start position or the present input position or the like, and also may be moved in a determined direction.

In addition, in the aforementioned each embodiment, the coordinates are inputted by the touch panel 22 provided on the screen of the LCD 14. However, in other embodiment, other pointing device such as a mouse may be used. In this case, the input position is clearly designated by displaying a mouse pointer on a game screen. Moreover, a state of pressing a button of the mouse is regarded as an input existence state, and a state of releasing the button of the mouse is regarded as a no-input state, and whereby the input-state/non-input state in the pointing device can be discriminated.

Although example embodiments of the present invention have been described and illustrated in detail, it is clearly understood that the same is by way of illustration and example only and is not to be taken by way of limitation, the spirit and scope of the present invention being limited only by the terms of the appended claims.

What is claimed is:

1. A storage medium storing an object movement control program of an information processing apparatus for displaying on a display an object moving in accordance with an input by an input device, wherein said object movement control program causes a processor of said information processing apparatus to function as:

a coordinate detection detector for detecting coordinates inputted to a screen of said display by said input device;

a first determination programmed logic circuitry for determining whether or not the coordinates detected by said coordinate detector correspond to coordinates in a first area on said screen;

a second determination programmed logic circuitry for determining whether or not the coordinates continuously detected after a determination result by said first determination programmed logic circuitry is affirmative are coordinates positioned outside of a second area on said screen;

a direction determination programmed logic circuitry for determining a moving direction based on the coordinates detected when a determination result by said second determination programmed logic circuitry is affirmative; and a movement controller for controlling said object to move in said moving direction determined by said direction determination programmed logic circuitry.

2. A storage medium storing an object movement control program according to claim 1, wherein said movement controller starts the movement of said object at a timing when the determination result by said second determination programmed logic circuitry is affirmative.

3. A storage medium storing an object movement control program according to claim 1, wherein said object movement control program causes said processor to further function as an object image display for displaying an image of said object in said first area.

4. A storage medium storing an object movement control program according to claim 1, wherein said second area encompasses said first area.

5. A storage medium storing an object movement control program according to claim 1, wherein said second area is provided with the coordinates detected when the determination result by said first determination programmed logic circuitry is affirmative as a reference.

6. A storage medium storing an object movement control program according to claim 1, wherein said second area is provided with a predetermined position in said first area as a reference.

7. A storage medium storing an object movement control program according to claim 1, wherein said direction determination programmed logic circuitry determines said moving direction, based on a predetermined position in said first area and the coordinates detected when the determination result by said second determination programmed logic circuitry is affirmative.

8. A storage medium storing an object movement control program according to claim 1, wherein
said direction determination programmed logic circuitry determines said moving direction, based on the coordinates detected when the determination result by said first determination programmed logic circuitry is affirmative and the coordinates detected when the determination result by said second determination programmed logic circuitry is affirmative.

9. A storage medium storing an object movement control program according to claim 1, wherein
said direction determination programmed logic circuitry determines the moving direction, based on the coordinates of at least two points out of the coordinates continuously detected by said coordinate detector from when the determination result by said first determination programmed logic circuitry is affirmative to when the determination result by said second determination programmed logic circuitry is affirmative.

10. A storage medium storing an object movement control program according to claim 1, wherein
said object movement control program causes said processor to further function as a third determination programmed logic circuitry for determining whether or not the coordinates continuously detected after the determination result by said first determination programmed logic circuitry is affirmative are the coordinates positioned outside of a third area different from at least said second area on said screen, and
said direction determination programmed logic circuitry determines said moving direction, based on the coordinates detected when the determination result by said third determination programmed logic circuitry is affirmative and the coordinates detected when the determination result by said second determination programmed logic circuitry is affirmative.

11. A storage medium storing an object movement control program according to claim 1, wherein
said object movement control program causes said processor to further function as a speed determination programmed logic circuitry for determining a moving speed based on a time period elapsed from when the determination result by said first determination programmed logic circuitry is affirmative to when the determination result by said second determination programmed logic circuitry is affirmative, and
said movement controller controls said object to move at said moving speed determined by said speed determination programmed logic circuitry.

12. A storage medium storing an object movement control program according to claim 1, wherein
said object movement control program causes said processor to further function as a speed determination programmed logic circuitry for determining a moving speed based on a time period elapsed from when it is determined that the coordinates continuously detected after the determination result by said first determination programmed logic circuitry is affirmative are the coordinates positioned outside of a third area different from at least said second area on said screen, to when the determination result by said second determination programmed logic circuitry is affirmative, and said movement controller controls said object to move at said moving speed determined by said speed determination programmed logic circuitry.

13. A storage medium storing an object movement control program according to claim 1, wherein
said direction determination programmed logic circuitry determines said moving direction, when the coordinates are not detected by said coordinate detector, before the determination result by said second determination programmed logic circuitry is affirmative, after the determination result by said first determination programmed logic circuitry is affirmative, based on the coordinates detected immediately before the coordinates are not detected, instead of the coordinates detected when the determination result by said second determination programmed logic circuitry is affirmative.

14. A storage medium storing an object movement control program according to claim 1, wherein
said movement controller does not move said object when the coordinates are not detected by said coordinate detector before it is determined that the coordinates continuously detected after the determination result by said first determination programmed logic circuitry is affirmative are the coordinates positioned outside of a third area different from at least said second area on said screen.

15. A storage medium storing an object movement control program according to claim 1, wherein
said object movement control program causes said processor to further function as an object generation programmed logic circuitry for generating, when said object is moved by said movement controller, another object different from said object.

16. A storage medium storing an object movement control program according to claim 1, wherein
said first area is larger than a display area of said object.

17. A storage medium storing an object movement control program according to claim 1, wherein
said first area has a same size as that of a display area of said object.

18. A storage medium storing an object movement control program of an information processing apparatus for displaying on a display an object moving in accordance with an input by an input device, wherein
said object movement control program causes a processor of said information processing apparatus to function as:
an object display controller for displaying said object on said display;
a coordinate detector for detecting coordinates inputted to a screen of said display by said input device;
a first determination programmed logic circuitry for determining whether or not the coordinates detected by said coordinate detector correspond to coordinates in a first area on said screen;
a second determination programmed logic circuitry for determining whether or not the coordinates continuously detected after a determination result by said first determination programmed logic circuitry is affirmative are coordinates positioned outside of a second area on said screen;
a direction determination programmed logic circuitry for determining a moving direction based on the coordinates of at least two points out of the coordinates continuously detected by said coordinate detector from when the determination result by said first determination programmed logic circuitry is affirmative to when a determination result by said second determination programmed logic circuitry is affirmative; and a movement controller for moving said object in said moving direction determined by said direction determination programmed logic circuitry, at a timing when the determination result by said second determination programmed logic circuitry is affirmative.

19. An information processing apparatus for displaying on a display an object moving in accordance with an input by an input device, comprising:

a coordinate detector for detecting coordinates inputted to a screen of said display by said input device;

a first determination programmed logic circuitry for determining whether or not the coordinates detected by said coordinate detector correspond to coordinates in a first area on said screen;

a second determination programmed logic circuitry for determining whether or not the coordinates continuously detected after a determination result by said first determination programmed logic circuitry is affirmative are coordinates positioned outside of a second area on said screen;

a direction determination programmed logic circuitry for determining a moving direction based on the coordinates detected when a determination result by said second determination programmed logic circuitry is affirmative; and a movement controller for controlling said object to move in said moving direction determined by said direction determination programmed logic circuitry.

20. An information processing apparatus for displaying on a display an object moving in accordance with an input by an input device, comprising:

an object display controller for displaying said object on said display;

a coordinate detector for detecting coordinates inputted to a screen of said display by said input device;

a first determination programmed logic circuitry for determining whether or not the coordinates detected by said coordinate detector correspond to coordinates in a first area on said screen;

a second determination programmed logic circuitry for determining whether or not the coordinates continuously detected after a determination result by said first determination programmed logic circuitry is affirmative are coordinates positioned outside of a second area on said screen;

a direction determination programmed logic circuitry for determining a moving direction based on the coordinates of at least two points out of the coordinates continuously detected by said coordinate detector from when the determination result by said first determination programmed logic circuitry is affirmative to when a determination result by said second determination programmed logic circuitry is affirmative; and a movement controller for moving said object in said moving direction determined by said direction determination programmed logic circuitry, at a timing when the determination result by said second determination programmed logic circuitry is affirmative.

* * * * *